(12) United States Patent
Kudo et al.

(10) Patent No.: US 8,593,537 B2
(45) Date of Patent: Nov. 26, 2013

(54) IMAGE SENSING APPARATUS, CONTROL METHOD THEREOF, AND PROGRAM FOR SUPPRESSING IMAGE DETERIORATION CAUSED BY FOREIGN SUBSTANCE

(75) Inventors: Keisuke Kudo, Kawasaki (JP); Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/466,839

(22) Filed: May 15, 2009

(65) Prior Publication Data

US 2009/0303339 A1 Dec. 10, 2009

(30) Foreign Application Priority Data

Jun. 5, 2008 (JP) ................................. 2008-148319
Jul. 3, 2008 (JP) ................................. 2008-174954

(51) Int. Cl.
*H04N 5/228* (2006.01)

(52) U.S. Cl.
USPC .................. 348/222.1; 348/231.3; 348/231.6; 348/247

(58) Field of Classification Search
USPC .......................... 348/222.1, 231.3, 231.6, 247
See application file for complete search history.

(56) References Cited

U.S. PATENT DOCUMENTS

2006/0115177 A1   6/2006  Ishiga
2007/0159551 A1*  7/2007  Kotani ........................... 348/349

FOREIGN PATENT DOCUMENTS

| CN | 101001318 A | 7/2007 |
| JP | 2004-222231 | 8/2004 |
| JP | 2005-328279 A | 11/2005 |
| JP | 2007-189467 A | 7/2007 |
| WO | 2007-032145 A1 | 3/2007 |

OTHER PUBLICATIONS

The above foreign patent documents were cited in a Feb. 24, 2011 Chinese Office Action, which is enclosed with an English Translation, that issued in Chinese Patent Application No. 200910145963.1.
The above foreign patent document was cited in Jun. 25, 2012 Japanese Office Action, which is enclosed without an English Translation, that issued in Japanese Patent Application No. 2008-174854.

* cited by examiner

*Primary Examiner* — Antoinette Spinks
(74) *Attorney, Agent, or Firm* — Cowan, Liebowitz & Latman, P.C.

(57) ABSTRACT

An image sensing apparatus includes an image sensing unit having an image sensor, an optical member which is arranged in front of the image sensor, a foreign substance detection unit which detects, from a foreign substance detection image including the image of a foreign substance adhered to the surface of the optical member, a recording unit which, when shooting a moving image, records moving image data generated based on image signals successively output from the image sensing unit, and records foreign substance information and lens information in addition to the moving image data, and a lens information obtaining unit which, when the lens information is updated by operating the imaging lens by a user during moving image shooting, obtains the updated lens information. When the lens information obtaining unit obtains the updated lens information, the recording unit records the updated lens information in addition to the moving image data.

4 Claims, 27 Drawing Sheets

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>    X-COORDINATE OF CENTER (2 BYTES)<br>    Y-COORDINATE OF CENTER (2 BYTES) |
| | | PARAMETERS OF DUST REGION $D_2$ |
| | | . . . |
| | | PARAMETERS OF DUST REGION $D_n$ |

| ADDRESS OFFSET (Hex) | CODE (Hex) | MEANING |
|---|---|---|
| +00 | | APERTURE VALUE IN SHOOTING (NUMERATOR) |
| +02 | | APERTURE VALUE IN SHOOTING (DENOMINATOR) |
| +04 | | LENS PUPIL POSITION IN SHOOTING (NUMERATOR) |
| +06 | | LENS PUPIL POSITION IN SHOOTING (DENOMINATOR) |
| +08 | | DUST CORRECTION DATA |

<MOVING IMAGE FILE FORMAT>

<MOVING IMAGE FILE FORMAT>

<MOVING IMAGE FILE FORMAT>

FIG. 20A
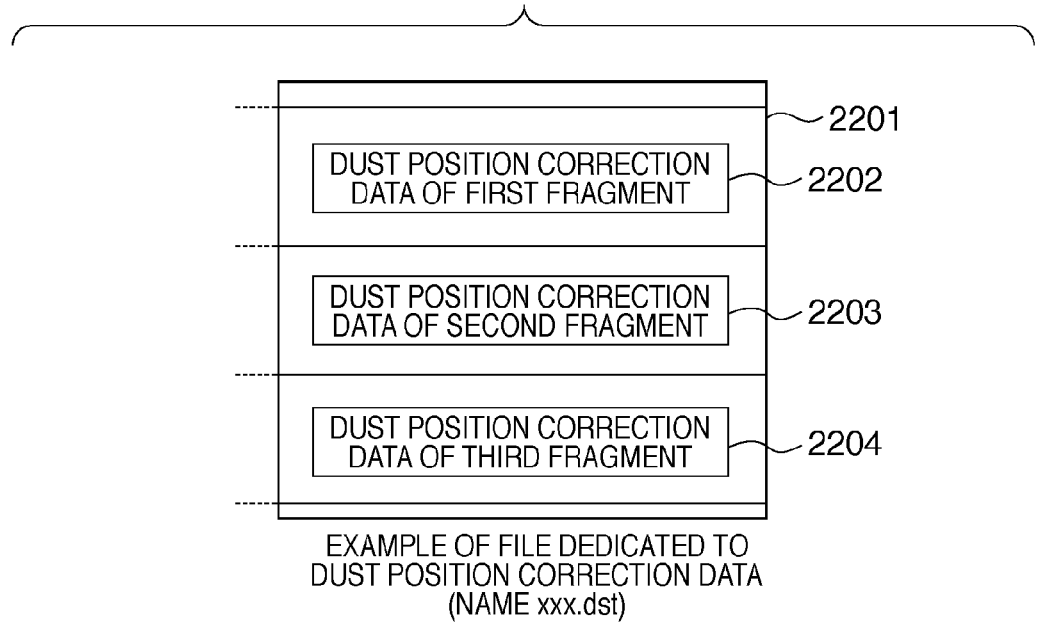
EXAMPLE OF FILE DEDICATED TO
DUST POSITION CORRECTION DATA
(NAME xxx.dst)
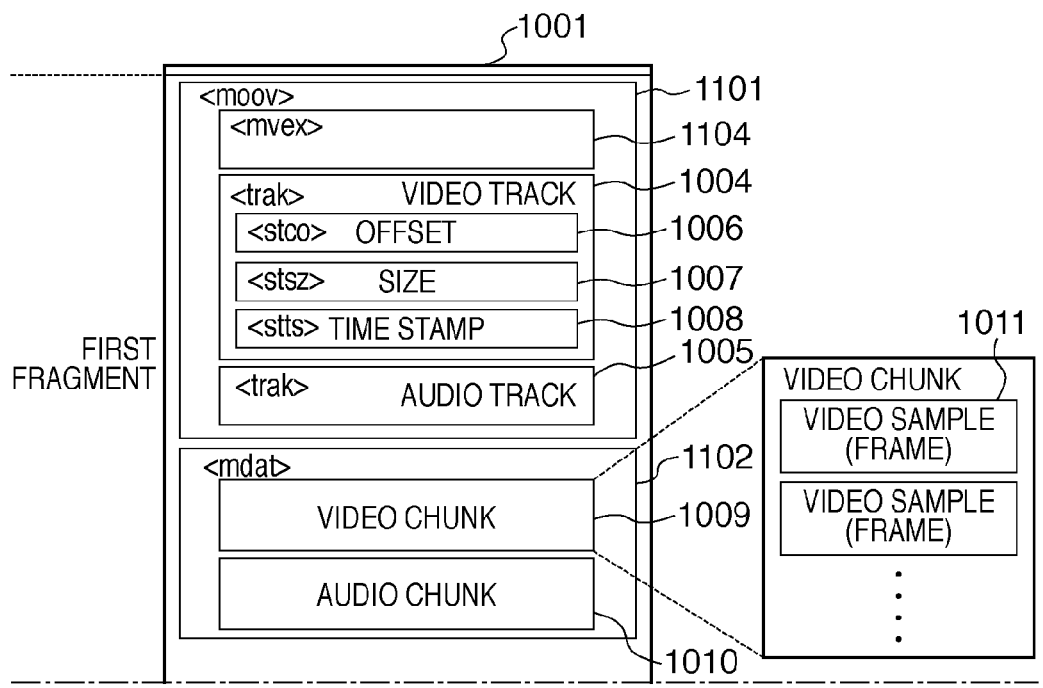

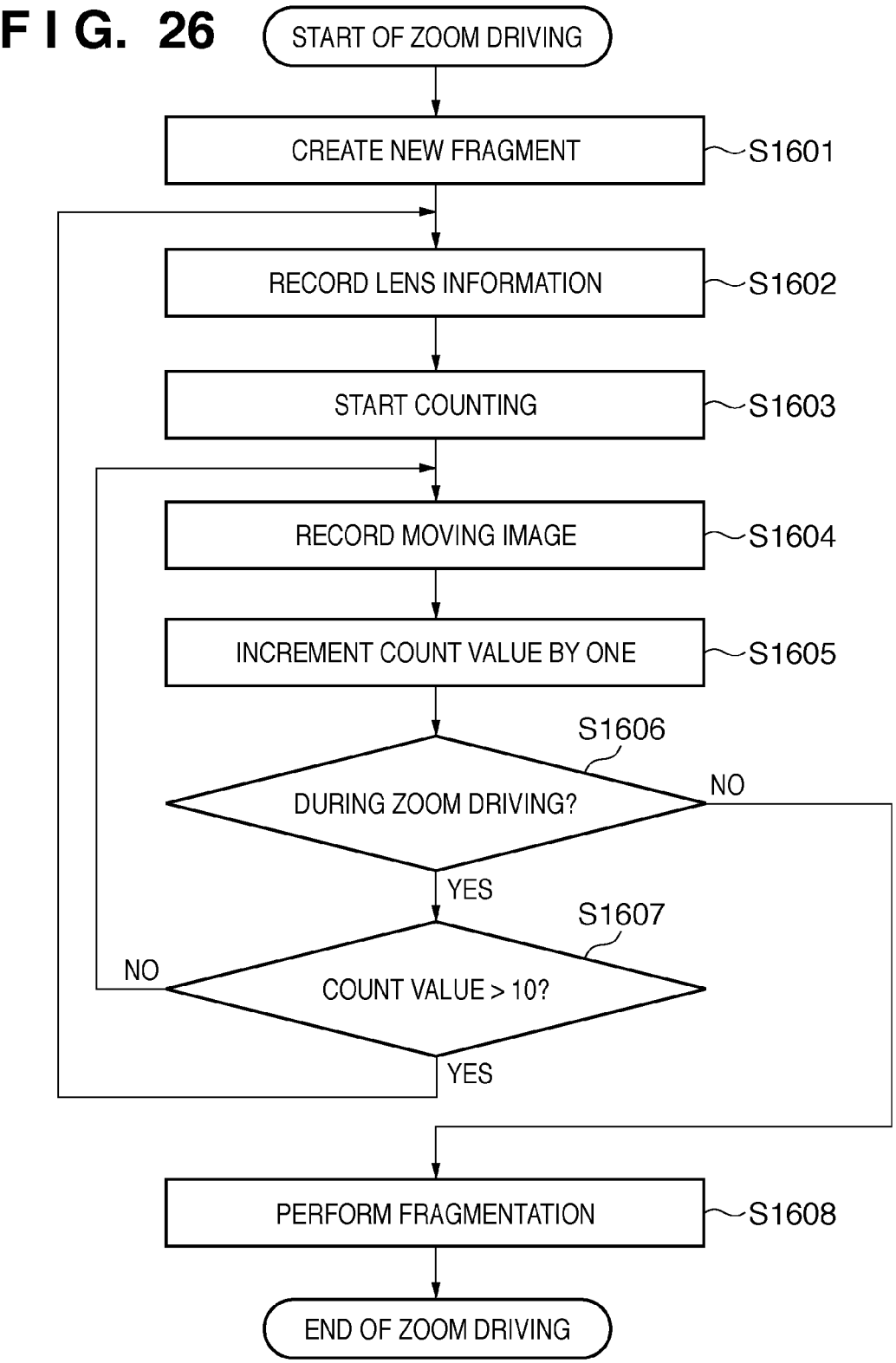

IMAGE SENSING APPARATUS, CONTROL METHOD THEREOF, AND PROGRAM FOR SUPPRESSING IMAGE DETERIORATION CAUSED BY FOREIGN SUBSTANCE

BACKGROUND OF THE INVENTION

1. Field of the Invention

The present invention relates to a technique of suppressing image deterioration caused by a foreign substance adhered to the surface of an optical low-pass filter or the like in an image sensing apparatus using an image sensor such as a CCD sensor or CMOS sensor.

2. Description of the Related Art

In a conventional lens-interchangeable digital camera, a foreign substance (to be simply referred to as dust hereinafter) such as dust or mote is sometimes adhered to an optical system or the surface of an image sensor cover glass or optical filter arranged in front of an image sensor (which will be generically referred to as an image sensor optical component). When dust is adhered to the image sensor optical component, it blocks light, and an image at the light-blocked portion is not shot, degrading the quality of the shot image.

Such dust on the image sensor is generally adhered not to the surface of the image sensor but to the surface of the cover glass or optical filter. The imaging state changes depending on the aperture value or pupil position of the imaging lens. More specifically, when the aperture value is almost the full-aperture one, the dust image blurs, and even if small dust is adhered, it does not matter. When the aperture value is large, a sharp dust image is formed, and even small dust adversely affects the entire image. To solve this problem, there is known a method of making dust less noticeable. According to this method, an image of only dust on an image sensor is prepared in advance by shooting a white wall or the like while setting the lens to a large aperture value. This image is used in combination with a shot still image (see Japanese Patent Laid-Open No. 2004-222231).

There have recently been proposed digital cameras with a moving image shooting function in addition to a still image shooting function. When a lens-interchangeable digital camera has the moving image shooting function, the aperture value and pupil position of the imaging lens change during moving image shooting in accordance with a lens operation (e.g., zoom operation). As a result, the imaging state of dust on the image sensor changes in every frame of the moving image. It is necessary to pay attention to the correspondence between an image shot for dust detection and actually shot images associated with it. If the method described in Japanese Patent Laid-Open No. 2004-222231 is simply applied to moving image shooting, the correspondence must be cumbersomely checked for each frame of the moving image.

SUMMARY OF THE INVENTION

The present invention is made to overcome the conventional drawbacks, and suppresses the influence, on a moving image, of a foreign substance such as dust adhered to a cover glass, filter, or the like arranged in front of an image sensor.

According to the first aspect of the present invention, there is provided an image sensing apparatus comprising an image sensing unit having an image sensor which photoelectrically converts an object image formed via an imaging lens, an optical member which is arranged in front of the image sensor, a foreign substance detection unit which detects, from a foreign substance detection image including an image of a foreign substance adhered to a surface of the optical member, foreign substance information serving as information including information on at least a position and size of the foreign substance, a recording unit which, when shooting a moving image, records moving image data generated based on image signals successively output from the image sensing unit, and records, in addition to the moving image data, lens information including the foreign substance information, information of an aperture value of the imaging lens, and information of a pupil position, and a lens information obtaining unit which, when the lens information is updated by operating the imaging lens by a user during moving image shooting, obtains the updated lens information, wherein when the lens information obtaining unit obtains the updated lens information, the recording unit records the updated lens information in addition to the moving image data.

According to the second aspect of the present invention, there is provided a method of controlling an image sensing apparatus including an image sensing unit having an image sensor which photoelectrically converts an object image formed via an imaging lens, and an optical member which is arranged in front of the image sensor, the method comprising a foreign substance detection step of detecting, from a foreign substance detection image including an image of a foreign substance adhered to a surface of the optical member, foreign substance information serving as information including information on at least a position and size of the foreign substance, a recording step of, when shooting a moving image, recording moving image data generated based on image signals successively output from the image sensing unit, and recording, in addition to the moving image data, lens information including the foreign substance information, information of an aperture value of the imaging lens, and information of a pupil position, and a lens information obtaining step of, when the lens information is updated by operating the imaging lens by a user during moving image shooting, obtaining the updated lens information, wherein in the recording step, when the updated lens information is obtained in the lens information obtaining step, the updated lens information is recorded in addition to the moving image data.

According to the third aspect of the present invention, there is provided an image sensing apparatus comprising an image sensing unit which photoelectrically converts an object image to generate an image signal, a foreign substance detection unit which detects, from a foreign substance detection image signal obtained by the image sensing unit, foreign substance information serving as information on at least a position and size of the foreign substance in an image sensing frame of the image sensing unit, a lens information obtaining unit which obtains lens information of a lens used to image an object, and a recording unit which, when shooting a moving image, records moving image data generated based on image signals successively output from the image sensing unit, and records, in addition to the moving image data, the foreign substance information detected by the foreign substance detection unit and the lens information obtained by the lens information obtaining unit, wherein the recording unit fragments the moving image data, records the fragments, adds lens information obtained by the lens information obtaining unit to each fragment, and records the lens information.

According to the fourth aspect of the present invention, there is provided a method of controlling an image sensing apparatus having an image sensing unit which photoelectrically converts an object image to generate an image signal, the method comprising a foreign substance detection step of detecting, from a foreign substance detection image signal obtained by the image sensing unit, foreign substance information serving as information on at least a position and size of the foreign substance in an image sensing frame of the image sensing unit, a lens information obtaining step of obtaining lens information of a lens used to image an object, and a recording step of, when shooting a moving image, recording moving image data generated based on image signals successively output from the image sensing unit, and recording, in addition to the moving image data, the foreign substance information detected in the foreign substance detection step and the lens information obtained in the lens information obtaining step, wherein in the recording step, the moving image data is fragmented to record the fragments, and lens information obtained in the lens information obtaining step is added to each fragment and recorded.

Further features of the present invention will become apparent from the following description of exemplary embodiments with reference to the attached drawings.

BRIEF DESCRIPTION OF THE DRAWINGS

FIG. 5 is a view showing an example of the data format of dust correction data;

FIGS. 20A and 20B are a schematic view showing the fourth example of the file structure in the first embodiment;

FIG. 26 is a flowchart showing a fragmentation method in zoom driving in the fifth embodiment.

DESCRIPTION OF THE EMBODIMENTS

Embodiments of the present invention will now be described in detail with reference to the accompanying drawings.

(First Embodiment)

Figure 1:
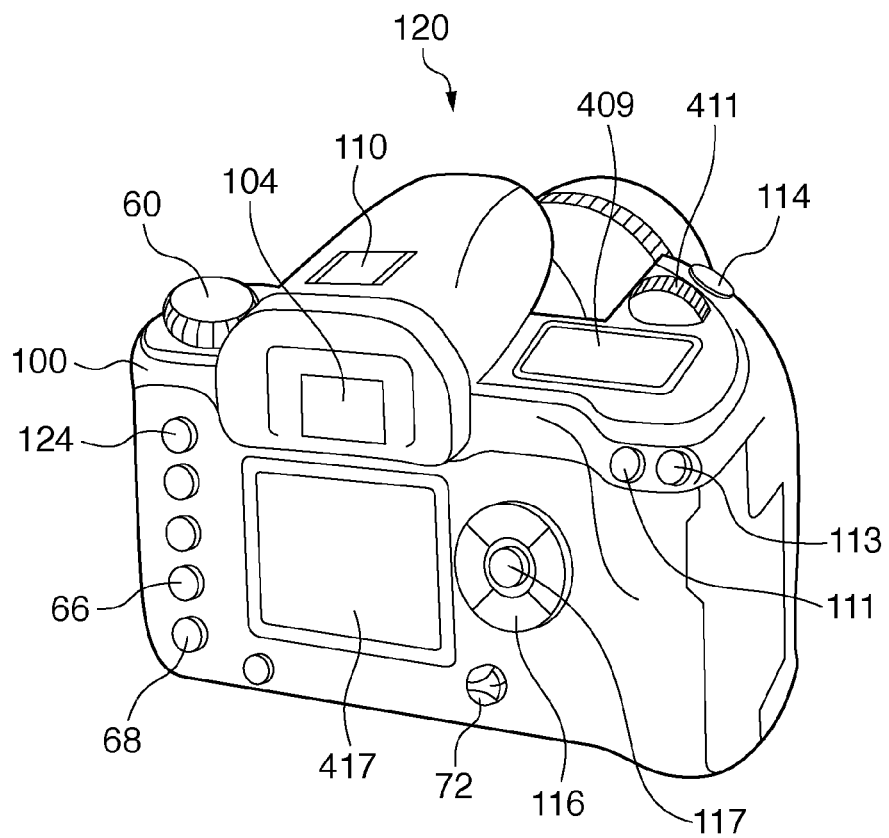
FIG. 1 is a perspective view showing the outer appearance of a lens-interchangeable single-lens reflex digital camera.
Figure 2:
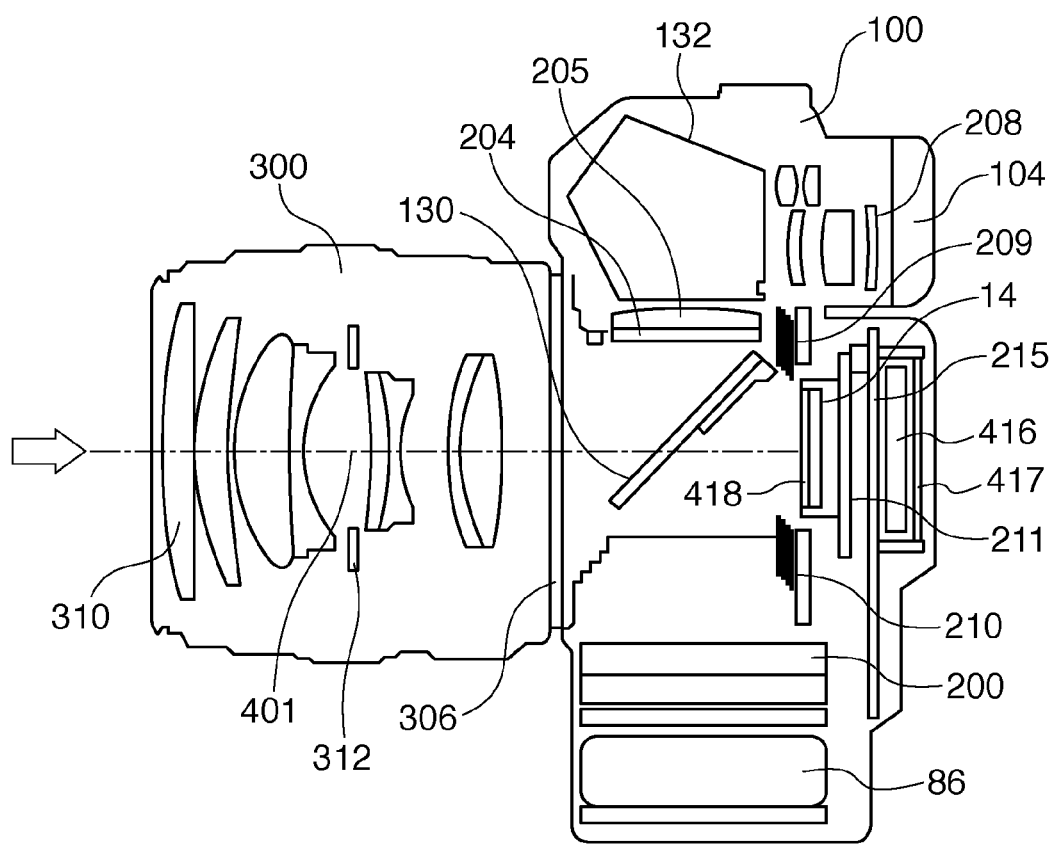
FIG. 2 is a vertical sectional view showing the internal structure of the lens-interchangeable single-lens reflex digital camera.

FIG. 1 is a perspective view showing the outer appearance of a digital camera 120 common to all the embodiments of the present invention. FIG. 2 is a vertical sectional view of FIG. 1.

Referring to FIG. 1, the top of a camera body 100 includes an accessory shoe 110, an optical viewfinder 104, an AE (Auto Exposure) lock button 111, an AF distance measurement point selection button 113, and a release button 114 for performing a shooting operation. The top of the camera body 100 also includes an electronic dial 411, mode dial 60, and external display 409. The electronic dial 411 is a multifunctional signal input device for inputting a numerical value to the camera in combination with another operation button, or switching the shooting mode. The external display 409 is formed from a liquid crystal display, and displays shooting conditions (e.g., shutter speed, aperture value, and shooting mode), and other kinds of information.

The rear side of the camera body 100 includes an LCD monitor 417 for displaying a shot image and various setup windows, a playback switch 66 for playing back a shot image on the LCD monitor 417, a single shooting/continuous shooting switch 68, a four-way selector switch 116, a menu button 124, and a power switch 72.

The single shooting/continuous shooting switch 68 can set a single shooting mode in which when the user presses a shutter switch SW2 64 (to be described later), shooting of one frame is done and then the camera stands by, and a continuous shooting mode in which shooting continues while the user presses the shutter switch SW2 64.

The four-way selector switch 116 includes four buttons arranged on the top, bottom, right, and left, and a SET button 117 arranged at the center. The user uses the four-way selector switch 116 to instruct the camera to select or execute a menu item or the like displayed on the LCD monitor 417.

The user uses the menu button 124 to display, on the LCD monitor 417, a menu window for making various settings of the camera. For example, when selecting and setting the shooting mode, the user presses the menu button 124, and operates the top, bottom, right, and left buttons of the four-way selector switch 116 to select a mode he wants. While the mode is selected, the user presses the SET button 117, completing the setting.

Figure 3:
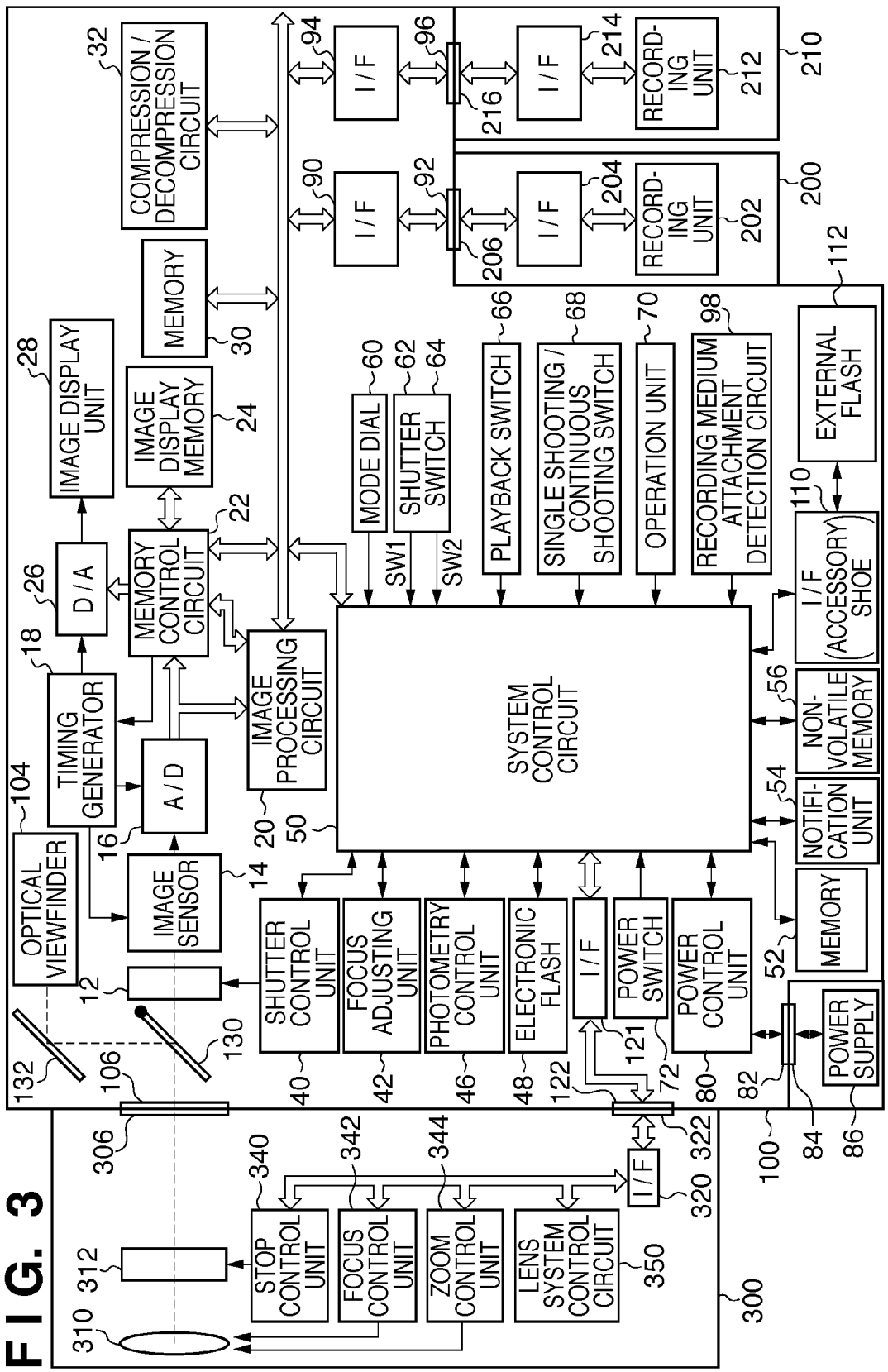
FIG. 3 is a block diagram showing the circuit arrangement of the lens-interchangeable single-lens reflex digital camera.

The LCD monitor 417 in the embodiment is of the transmission type. By only driving the LCD monitor, the user cannot see an image. The LCD monitor 417 requires a backlight illumination unit 416 behind it, as shown in FIG. 2. The LCD monitor 417 and backlight illumination unit 416 form an image display unit 28, as shown in FIG. 3.

As shown in FIG. 2, the image sensing apparatus according to the embodiment mainly includes the camera body 100 and a lens-interchangeable lens unit 300. In FIG. 2, reference numeral 401 denotes an imaging optical axis.

The lens unit 300 includes an imaging lens 310 formed from a plurality of lenses, a stop 312, and a lens mount 306 which mechanically connects the lens unit 300 to the camera body 100. The lens unit 300 is detachable from the camera body 100 via the lens mount 306.

In the camera body 100, a mirror 130 is inserted in the imaging optical path, and is movable between a position (position shown in FIG. 2, which will be called an inclined mirror position) where the mirror 130 guides object light traveling from the lens unit 300 to the optical viewfinder system, and a position (to be called a retraction position) where it retracts from the imaging optical path. The mirror 130 may also be a quick return mirror or half-mirror.

Referring to FIG. 2, object light guided from the mirror 130 to the optical viewfinder 104 forms an image on a focusing screen 204. A condenser lens 205 improves the visibility of the viewfinder. A pentagonal roof prism 132 guides the object light having passed through the focusing screen 204 and condenser lens 205 to an eyepiece lens 208 for viewfinder observation and the optical viewfinder 104.

A second curtain 209 and first curtain 210 form a shutter. The second curtain 209 and first curtain 210 are opened to expose, for a necessary time, an image sensor 14 which is arranged behind them to photoelectrically convert an object image. An optical low-pass filter 418 is arranged in front of the image sensor 14, and adjusts the special frequency of the object image to be formed on the image sensor 14. Dust (foreign substance) which adversely affects a shot image is adhered to the optical low-pass filter 418. Such dust appears as a shadow in an object image formed on the image sensor 14, degrading the quality of the shot image.

A printed board 211 holds the image sensor 14. A display board 215, which is another printed board, is arranged behind the printed board 211. The LCD monitor 417 and backlight illumination unit 416 are arranged on a surface of the display board 215 that is opposite to the printed board 211.

A recording medium 200 records image data. The camera uses a cell (portable power supply) 86. The recording medium 200 and cell 86 are detachable from the camera body.

FIG. 3 is a block diagram showing the circuit arrangement of the lens-interchangeable digital camera common to all the embodiments of the present invention.

The arrangement of the lens unit 300 will be explained.

The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, status signals, and data signals between the camera body 100 and the lens unit 300 and receiving currents of various voltages. The connector 322 may also communicate not only by telecommunication but also by optical communication or speech communication.

A stop control unit 340 controls the stop 312 in cooperation with a shutter control unit 40 (to be described later) which controls a shutter 12 of the camera body 100 based on photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information (e.g., a number unique to the lens unit 300), management information, functional information (e.g., a full-aperture value, minimum aperture value, and focal length), and current and past set values.

The arrangement of the camera body 100 will be described next.

A lens mount 106 mechanically connects the camera body 100 to the lens unit 300. The shutter 12 includes the second curtain 209 and first curtain 210. According to the single-lens reflex method, a light beam which has entered the imaging lens 310 is guided via the stop 312 serving as a light quantity restriction unit, the lens mounts 306 and 106, the mirror 130, and the shutter 12, and forms an optical image on the image sensor 14.

An A/D converter 16 converts an analog signal output from the image sensor 14 into a digital signal. A timing generator 18 supplies clock signals and control signals to the image sensor 14, the A/D converter 16, and a D/A converter 26. A memory control circuit 22 and system control circuit 50 control the timing generator 18.

An image processing circuit 20 executes predetermined pixel interpolation processing and color conversion processing for data from the A/D converter 16 or data from the memory control circuit 22. If necessary, the image processing circuit 20 performs predetermined arithmetic processing using image data output from the A/D converter 16. Based on the obtained arithmetic result, the system control circuit 50 can execute auto focus (AF) processing, auto exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16, and performs auto white balance (AWB) processing of TTL scheme based on the obtained arithmetic result.

In the example shown in FIG. 3 in the embodiment, the focus adjusting unit 42 and photometry control unit 46 are provided for exclusive use. Hence, AF processing, AE processing, and EF processing may also be done using not the image processing circuit 20 but the focus adjusting unit 42 and photometry control unit 46. Alternatively, AF processing, AE processing, and EF processing may also be performed first using the focus adjusting unit 42 and photometry control unit 46 and then using the image processing circuit 20.

The memory control circuit 22 controls the A/D converter 16, the timing generator 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

The image display unit 28 includes the LCD monitor 417 and backlight illumination unit 416. Display image data written in the image display memory 24 is displayed on the image display unit 28 via the D/A converter 26. The image display unit 28 sequentially displays sensed image data, implementing an electronic viewfinder (EVF) function. The image display unit 28 can arbitrarily turn on/off its display in accordance with an instruction from the system control circuit 50. When display is OFF, the power consumption of the camera body 100 can be greatly reduced.

The memory 30 stores shot still images and has a memory capacity enough to store a predetermined number of still images. Even in continuous shooting or panoramic shooting for continuously shooting a plurality of still images, the memory 30 allows writing many images in it at high speed. In moving image shooting, the memory 30 is used as a frame buffer for continuously writing images at a predetermined rate. The memory 30 is also available as the work area of the system control circuit 50.

The compression/decompression circuit 32 compresses/decompresses image data using a known compression method. The compression/decompression circuit 32 reads out an image from the memory 30, compresses or decompresses it, and writes the processed data in the memory 30 again.

The shutter control unit 40 controls the shutter 12 in cooperation with the stop control unit 340 which controls the stop 312 based on photometry information from the photometry control unit 46. The focus adjusting unit 42 executes AF (Auto Focus) processing. According to the single-lens reflex method, a light beam which has entered the imaging lens 310 of the lens unit 300 is guided via the stop 312, the lens mounts 306 and 106, the mirror 130, and a focus adjusting sub-mirror (not shown). The focus adjusting unit 42 detects the focus state of an image formed by the light beam as an optical image.

The photometry control unit 46 executes AE (Auto Exposure) processing. According to the single-lens reflex method, a light beam which has entered the imaging lens 310 of the lens unit 300 is guided via the stop 312, the lens mounts 306 and 106, the mirror 130, and a photometry sub-mirror (not shown). The photometry control unit 46 measures the exposure state of an image formed by the light beam as an optical image. An electronic flash 48 has an AF auxiliary light projecting function and an electronic flash control function. The photometry control unit 46 also has an EF (Electronic Flash control) processing function in cooperation with the electronic flash 48.

AF control may also be done using the measurement result of the focus adjusting unit 42 and an arithmetic result obtained by arithmetically processing image data from the A/D converter 16 by the image processing circuit 20. Exposure control may also be performed using the measurement result of the photometry control unit 46 and an arithmetic result obtained by arithmetically processing image data from the A/D converter 16 by the image processing circuit 20.

The system control circuit 50 controls the overall camera body 100 and incorporates a known CPU. A memory 52 stores constants, variables, and programs for the operation of the system control circuit 50.

A notification unit 54 notifies the outside of operation states and messages using a text, image, and sound in accordance with execution of a program by the system control circuit 50. The notification unit 54 is, e.g., a display unit such as an LCD or LED for providing a visual display, or a sound generation element for generating a notification by sound. The notification unit 54 includes one or a combination of them. Especially when the notification unit 54 is a display unit, it is arranged at one or a plurality of positions near an operation unit 70 of the camera body 100, like the external display 409, where the user can easily see a notification. Some functions of the notification unit 54 are arranged in the optical viewfinder 104.

Among the display contents of the notification unit 54, the image display unit 28 such as an LCD presents a display associated with shooting modes including single shooting/continuous shooting and self timer. The image display unit 28 also presents a display associated with recording including the compression ratio, the number of recording pixels, the number of recorded images, and the number of recordable images. Further, the image display unit 28 presents a display associated with shooting conditions including the shutter speed, aperture value, exposure compensation, brightness correction, external flash light emission amount, and red eye mitigation. The image display unit 28 also displays macro shooting, buzzer setting, battery level, error message, information by a plurality of digits, and the attached/detached states of the recording medium 200 and a PC 210. In addition, the image display unit 28 displays the attached/detached state of the lens unit 300, communication I/F operation, date and time, and the connection state of an external computer.

Some of the display contents of the notification unit 54 are indicated in the optical viewfinder 104, which include in-focus, ready for shooting, camera shake warning, flash charge, flash charge completion, shutter speed, aperture value, exposure compensation, and recording medium write operation.

A nonvolatile memory 56 is an electrically erasable/programmable memory such as an EEPROM, and stores programs (to be described later) and the like.

Reference numerals 60, 62, 64, 66, 68, and 70 denote operation units for inputting various kinds of operation instructions to the system control circuit 50. Each operation unit includes one or a combination of a switch, dial, touch panel, pointing by line-of-sight detection, and voice recognition device.

These operation units will be described here in detail.

The mode dial switch 60 can selectively set a shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a shooting mode such as a portrait shooting mode, landscape shooting mode, closeup shooting mode, sports shooting mode, nightscape shooting mode, panoramic shooting mode, and moving image shooting mode.

The shutter switch SW1 62 is turned on by operating the release button 114 halfway (e.g., half stroke) to designate the start of an operation such as AF processing, AE processing, AWB processing, or EF processing.

The shutter switch SW2 64 is turned on by operating the release button 114 completely (e.g., full stroke) to designate the start of a series of processes including exposure, development, and recording. In the exposure processing, a signal read out from the image sensor 14 is written in the memory 30 via the A/D converter 16 and memory control circuit 22. Then, the development processing is done using calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation of reading out an image shot in a shooting mode from the memory 30, recording medium 200, or PC 210 and displaying it on the image display unit 28. The playback switch 66 can set a functional mode such as a playback mode, multiwindow playback/erase mode, or PC-connected mode.

The single shooting/continuous shooting switch 68 can set a single shooting mode in which when the user presses the shutter switch SW2 64, shooting of one frame is done, and then the camera stands by, and a continuous shooting mode in which shooting continues while the user presses the shutter switch SW2 64.

The operation unit 70 includes various buttons and a touch panel. For example, the operation unit 70 includes a live view start/stop button, a movie recording start/stop button, the menu button 124, the SET button 117, a multiwindow playback/page feed button, an electronic flash setting button, a single shooting/continuous shooting/self timer switch button, the four-way selector switch 116, the AE (Auto Exposure) lock button 111, the AF distance measurement point selection button 113, and the electronic dial 411. Further, the operation unit 70 includes a playback image move + (plus) button, playback image move − (minus) button, shooting image quality selection button, exposure compensation button, brightness correction button, external flash light emission amount setting button, and date/time setting button. When a rotary dial switch is used for the top, bottom, right, and left buttons of the four-way selector switch 116, it allows the user to more easily select numerical values and functions.

In addition, the operation unit 70 includes an image display ON/OFF switch for turning on/off the image display unit 28, and a quick review ON/OFF switch for setting a quick review function of automatically playing back shot image data immediately after shooting. The operation unit 70 also includes a compression mode switch for selecting a compression ratio for JPEG compression, or a RAW mode to directly digitize a signal from the image sensor and record it on a recording medium. Further, the operation unit 70 includes an AF mode setting switch capable of setting a one-shot AF mode or a servo AF mode. In the one-shot AF mode, the auto focus operation starts when the user presses the shutter switch SW1 62. Once an in-focus state is obtained, this state is kept held. In the servo AF mode, the auto focus operation continues while the user presses the shutter switch SW1 62. The operation unit 70 also includes a setting switch capable of setting a dust information obtainment mode to sense a dust detection image and obtain dust information, as will be described later.

The power switch 72 can selectively set the power ON or power OFF mode of the camera body 100. The power switch 72 can also selectively set the power ON or power OFF mode of each of various accessories including the lens unit 300, an external flash 112, the recording medium 200, and the PC 210 which are connected to the camera body 100.

A power supply control unit 80 includes a cell detection circuit, DC/DC converter, and switching circuit for switching a block to be energized. The power supply control unit 80 detects attachment/detachment of a cell, the type of cell, and the battery level. The power supply control unit 80 controls the DC/DC converter based on the detection result and an instruction from the system control circuit 50. The power supply control unit 80 supplies a necessary voltage to the respective units including a recording medium for a necessary period.

Reference numerals 82 and 84 denote connectors; and 86, a power supply unit formed from a primary cell (e.g., alkaline cell or lithium cell), a secondary cell (e.g., an NiCd cell, NiMH cell, Li-ion cell, or Li-polymer cell), or an AC adapter.

Reference numerals 90 and 94 denote interfaces with a PC and a recording medium such as a memory card or hard disk; and 92 and 96, connectors to connect a PC and a recording medium such as a memory card or hard disk. A recording medium attachment detection circuit 98 detects whether the recording medium 200 and/or PC 210 is connected to the connectors 92 and/or 96.

In the embodiment, the camera has two interfaces and two connectors to connect a recording medium. However, the numbers of interfaces and connectors to connect a recording medium are arbitrary, and the camera can have one or a plurality of interfaces or connectors. Interfaces and connectors of different standards may also be combined.

Interfaces and connectors complying with various storage medium standards are available. Examples are a PCMCIA (Personal Computer Memory Card International Association) card, CF (Compact Flash®) card, and SD card. When the interfaces 90 and 94 and the connectors 92 and 96 comply with the standard of the PCMCIA card or CF® card, they can connect various kinds of communication cards. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also usable. Various kinds of communication cards can be connected to transfer image data and management information associated with it to another computer or a peripheral device such as a printer.

The optical viewfinder 104 can display an optical image formed by a light beam which has entered the imaging lens 310 and is guided via the stop 312, lens mounts 306 and 106, and mirrors 130 and 132 by the single-lens reflex method. Only with the optical viewfinder, the user can take a picture without using the electronic viewfinder function of the image display unit 28. The optical viewfinder 104 displays some functions of the notification unit 54 such as the in-focus state, camera shake warning, flash charge, shutter speed, aperture value, and exposure compensation.

The external flash 112 is attached via the accessory shoe 110.

An interface 121 connects the camera body 100 to the lens unit 300 in the lens mount 106.

A connector 122 electrically connects the camera body 100 to the lens unit 300. A lens attachment detection unit (not shown) detects whether the lens unit 300 is attached to the lens mount 106 and connector 122. The connector 122 also has a function of transmitting control signals, status signals, data signals, and the like between the camera body 100 and the lens unit 300 and also supplying currents of various voltages.

The memory 30 of the camera body 100 stores various kinds of optical information (e.g., aperture value, zoom position, pupil distance, and focal length) of the lens unit 300 that are communicated via the connector 122. In some cases, the camera requests communication of the information. Every time the information is updated, the lens may communicate it.

The connector 122 may also communicate not only by telecommunication but also by optical communication or speech communication.

The recording medium 200 is, e.g., a memory card or hard disk. The recording medium 200 includes a recording unit 202 formed from a semiconductor memory or magnetic disk, an interface 204 with the camera body 100, and a connector 206 to connect the camera body 100.

The recording medium 200 can be a memory card (e.g., PCMCIA card or Compact Flash®), or a hard disk. The recording medium 200 may also be a micro DAT, a magnetooptical disk, an optical disk (e.g., CD-R or CD-RW), or a phase-change optical disk (e.g., DVD).

The PC 210 includes a recording unit 212 formed from a magnetic disk (HD), an interface 214 with the camera body 100, and a connector 216 to connect the camera body 100. The interface 214 can be a USB or interface, but is not particularly limited.

Processing of performing image processing to eliminate the influence of dust on an optical member such as a low-pass filter or cover glass arranged in front of the image sensor in the image sensing apparatus having the above-described arrangement will be described next.

In the embodiment, the camera shoots a dust detection image (foreign substance detection image) for obtaining dust information (foreign substance information) serving as information on the adhesion position and size of dust (foreign substance). Then, the dust detection image is extracted to generate dust data. The dust detection image is preferably obtained by shooting a surface as uniformly bright as possible. However, the uniformity need not be strict because it is desirable to easily shoot the image in a familiar place. For example, the embodiment assumes shooting a blue sky or white wall.

Figure 4:
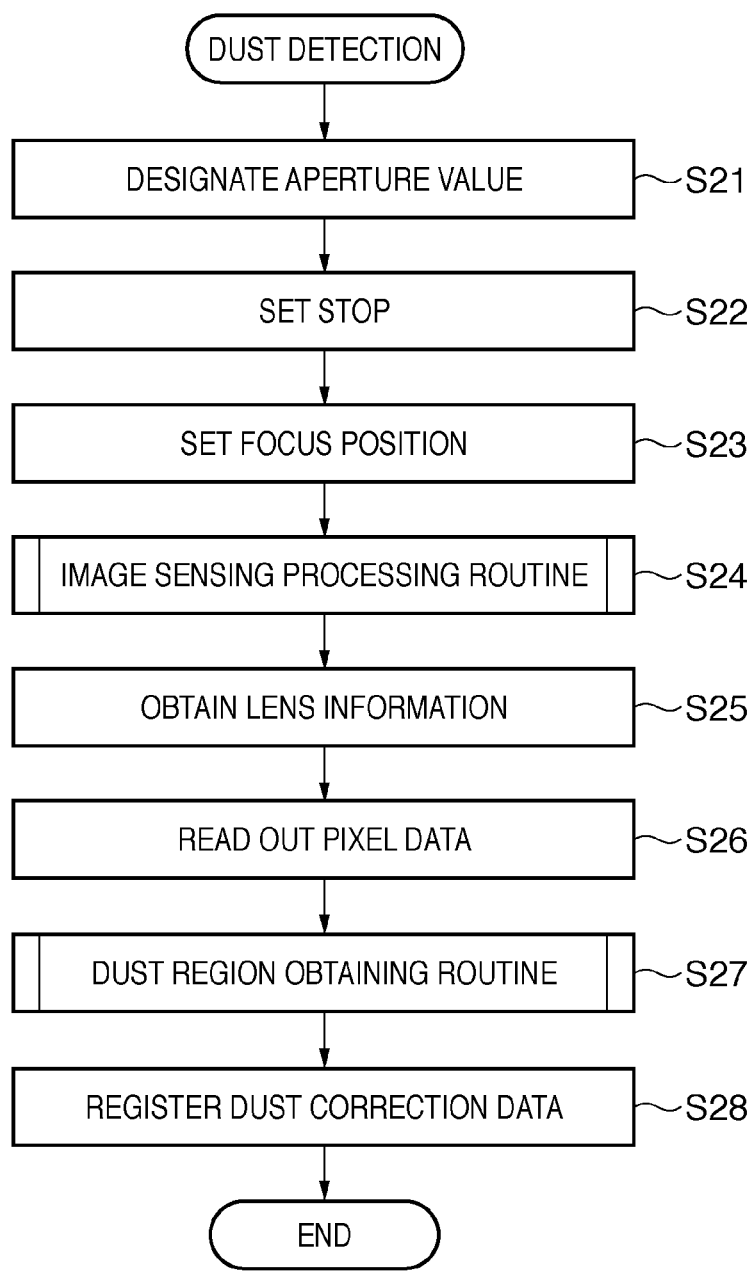
FIG. 4 is a flowchart for explaining dust detection processing.

An example of processing to detect the position of dust adhered in the image sensing optical system will be explained with reference to the flowchart of FIG. 4. The system control circuit 50 performs this processing by executing a dust detection processing program stored in the nonvolatile memory 56.

In the dust detection processing, a dust detection image is shot. When performing the dust detection processing, the user prepares for dust detection by setting the camera to direct the imaging optical axis 401 of the lens unit 300 to the exit surface of a surface light source or a surface with a uniform color, like a white wall. The user also prepares for dust detection by attaching a dust detection light unit (compact point light source attached instead of the lens) to the lens mount 106. The light source of the light unit is, e.g., a white LED, and the size of the light emitting surface is desirably adjusted to comply with a predetermined aperture value (e.g., F32).

The embodiment will explain dust detection using a general imaging lens. The dust detection may also be done by attaching the light unit to the lens mount 106. In the embodiment, a dust detection image is an image with a uniform color.

After the end of preparation, when the user instructs the camera via the four-way selector switch 116 to start dust detection processing, the system control circuit 50 sets the stop first. The imaging state of dust near the image sensor changes depending on the aperture value of the lens, and its position changes depending on the lens pupil position. For this reason, dust correction data needs to hold an aperture value and lens pupil position in detection, in addition to the position and size of dust.

However, dust correction data need not always hold an aperture value if it is set to always use the same aperture value even for different lenses when creating dust correction data. As for the pupil position, dust correction data need not always hold it if the light unit is used or the use of only a specific lens is permitted.

In other words, if the use of a plurality of types of lenses is permitted or the aperture value is properly changed when creating dust correction data, the dust correction data needs to hold an aperture value and lens pupil position in detection. Note that the pupil position means a distance from the image sensing plane (focal plane) of the exit pupil.

For example, F32 is designated (step S21).

Then, the system control circuit 50 causes the stop control unit 340 via the connector 122 to control the aperture blades of the lens unit 300 and set the stop to the aperture value designated in step S21 (step S22). The system control circuit 50 causes the focus control unit 342 to set the focus position to infinity (step S23).

After setting the aperture value and focus position of the imaging lens, the system control circuit 50 executes shooting in the dust detection mode (step S24). Details of the image sensing processing routine in step S24 will be explained with reference to FIG. 9. The memory 30 stores the shot image data.

After the end of shooting, the system control circuit 50 obtains an aperture value and lens pupil position in shooting (step S25). The system control circuit 50 reads out, to the image processing circuit 20, data corresponding to each pixel of the shot image stored in the memory 30 (step S26). The image processing circuit 20 performs processing shown in FIG. 6, obtaining the position and size of a pixel where dust exists (step S27). The nonvolatile memory 56 registers the position and size of the pixel where dust exists, which have been obtained in step S27, and the aperture value and lens pupil position information which have been obtained in step S25 (step S28). When the foregoing light unit is used, no lens information can be obtained. When no lens information can be obtained, the system control circuit 50 determines that the light unit has been used. Then, the nonvolatile memory 56 registers predetermined lens pupil position information, and an aperture value calculated from the light source diameter of the light unit.

In step S28, the system control circuit 50 compares the position of a defective pixel (pixel defect) in the manufacture that is recorded in advance in the nonvolatile memory 56 with the position of the readout pixel data, and determines whether the target pixel is defective. The nonvolatile memory 56 may also register only the position of a region determined not to have a pixel defect.

FIG. 5 shows an example of the data format of dust correction data stored in the nonvolatile memory 56. As shown in FIG. 5, the dust correction data stores lens information, dust position, and size information obtained when a detection image was shot.

More specifically, an actual aperture value (F-number) used to shoot a detection image, and lens pupil position at that time are stored as lens information obtained when a detection image was shot. Then, the number (integer value) of detected dust regions is stored in the storage area. Subsequently, concrete parameters of each dust region are repetitively stored by the number of dust regions. The parameters of each dust region are a set of three numerical values: the radius (e.g., 2 bytes) of dust, the x-coordinate (e.g., 2 bytes) of the center in the effective image region, and the y-coordinate (e.g., 2 bytes) of the center.

If the dust correction data size is limited by the capacity of the nonvolatile memory 56 or the like, data are stored preferentially from the start of dust regions obtained in step S27. This is because dust regions are sorted in order from the most conspicuous dust in the dust region obtaining routine of step S27, which will be described later.

Details of the dust region obtaining routine in step S27 of FIG. 4 will be explained with reference to FIGS. 6 to 8.

Figure 7:
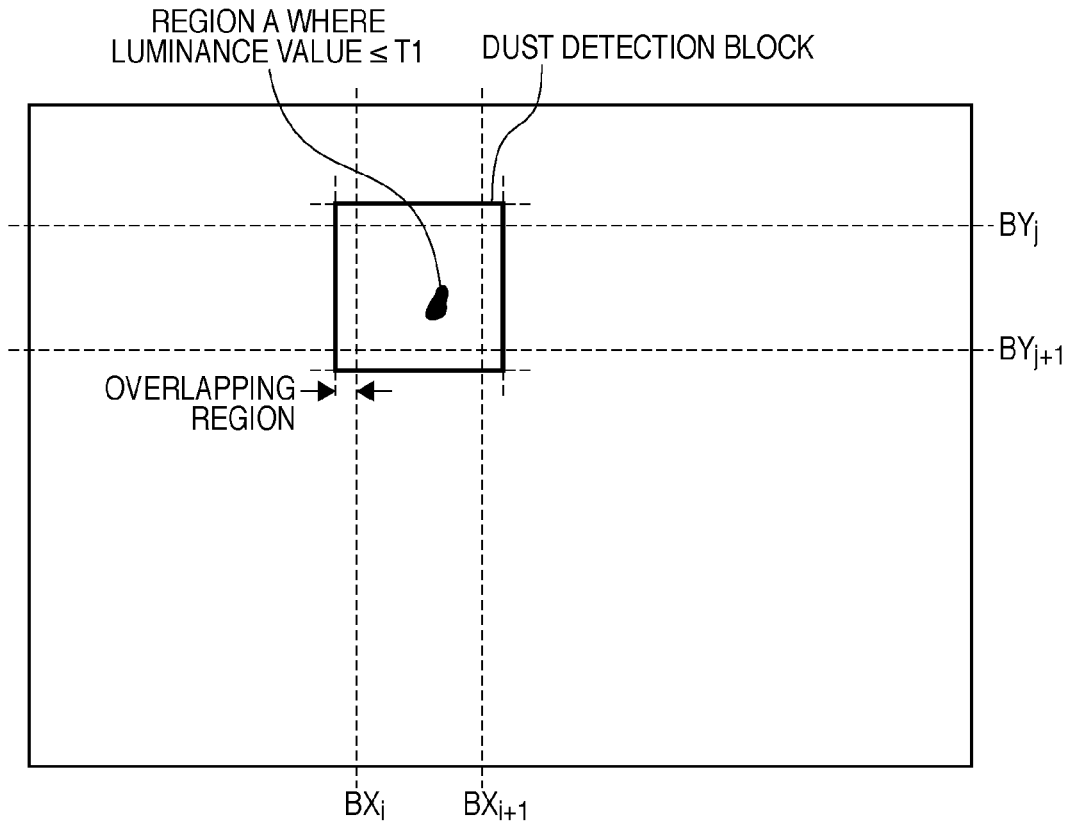
FIG. 7 is a view showing the processing unit of dust region determination processing in step S62 of FIG. 6.

As shown in FIG. 7, readout image data is rasterized in the memory 30, and processed for each predetermined block in order to cope with limb darkening arising from the lens or sensor characteristic. Limb darkening is a phenomenon in which the luminance at the periphery of the lens becomes lower than that at the center. It is known that limb darkening can be reduced to a certain degree by setting the lens to a large aperture value. However, even if the lens is set to a large aperture value, dust at the periphery may not be accurately detected depending on the lens when the position of dust in a shot image is determined based on a predetermined threshold value. From this, the influence of limb darkening is reduced by dividing an image into blocks.

If an image is simply divided into blocks, the dust detection result may change between blocks when the threshold value changes between them. To prevent this, blocks are made to overlap each other. A pixel determined to have dust in either block of the overlapping region is handled as a dust region.

Figure 6:
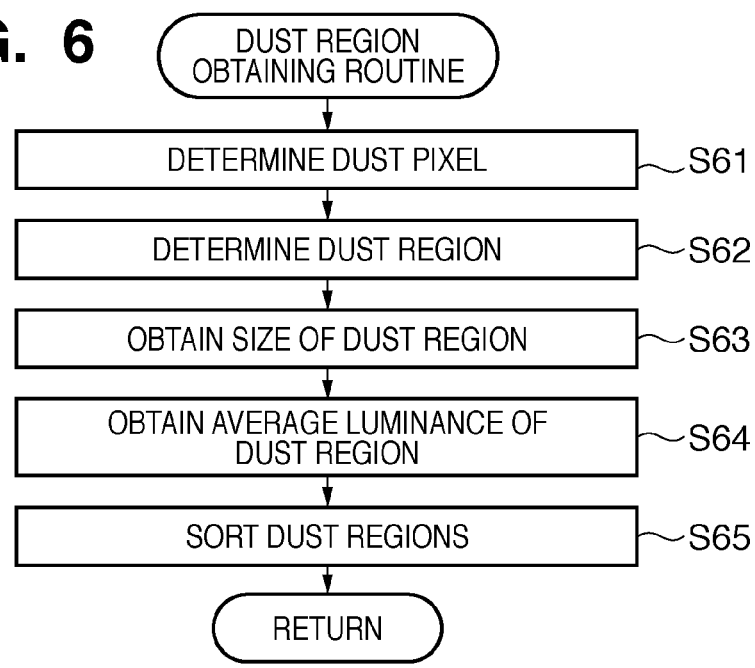
FIG. 6 is a flowchart for explaining details of a dust region obtaining routine in step S27 of FIG. 4.

Determination of a dust region in a block is executed according to the processing sequence shown in FIG. 6. A maximum luminance Lmax and average luminance Lave in each block are calculated. A threshold value T1 in each block is calculated by $$T1 = Lave \times 0.6 + Lmax \times 0.4$$

A pixel whose luminance does not exceed the threshold value is determined as a dust pixel (step S61). Each isolated region formed from dust pixels is defined as a dust region di (i=0, 1, ..., n) (step S62). As shown in FIG. 8, a maximum value Xmax and minimum value Xmin of the horizontal coordinates of pixels falling within a dust region, and a maximum value Ymax and minimum value Ymin of their vertical coordinates are obtained. A radius ri representing the size of the dust region di is calculated (step S63):

$$ri=\sqrt{[\{(Xmax-Xmin)/2\}^2+\{(Ymax-Ymin)/2\}^2]}$$

Figure 8:
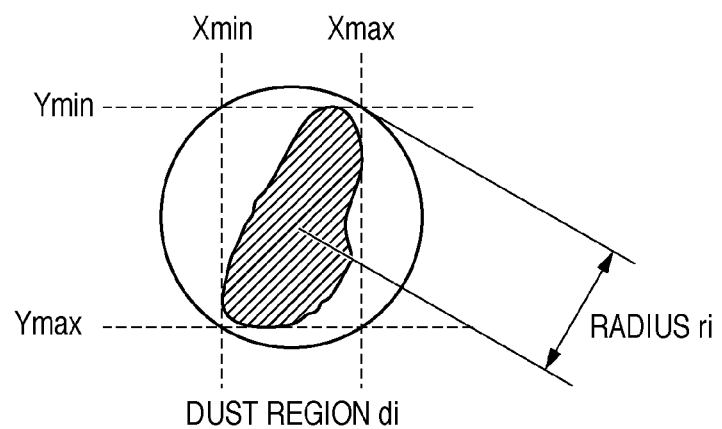
FIG. 8 is a view showing an outline of calculating the size of a dust region in step S63 of FIG. 6.

FIG. 8 shows the relationship between Xmax, Xmin, Ymax, Ymin, and ri.

In step S64, the average luminance value of each dust region is calculated.

The size of dust correction data is sometimes limited by the capacity of the nonvolatile memory 56 or the like. To cope with this case, pieces of dust position information are sorted by the size or average luminance value of the dust region (step S65). In the embodiment, pieces of dust position information are sorted in descending order of ri. If all dust regions have the same ri, they are sorted in ascending order of the average luminance value. As a result, noticeable dust can be preferentially registered in dust correction data. Di represents a sorted dust region, and Ri represents the radius of the dust region Di.

If there is a dust region larger than a predetermined size, it may also be excluded from the sorting targets and added to the end of the sorted-dust region list. A large dust region may degrade the image quality if it undergoes interpolation processing later. It is desirable to correct such a large dust region finally.

Figure 9:
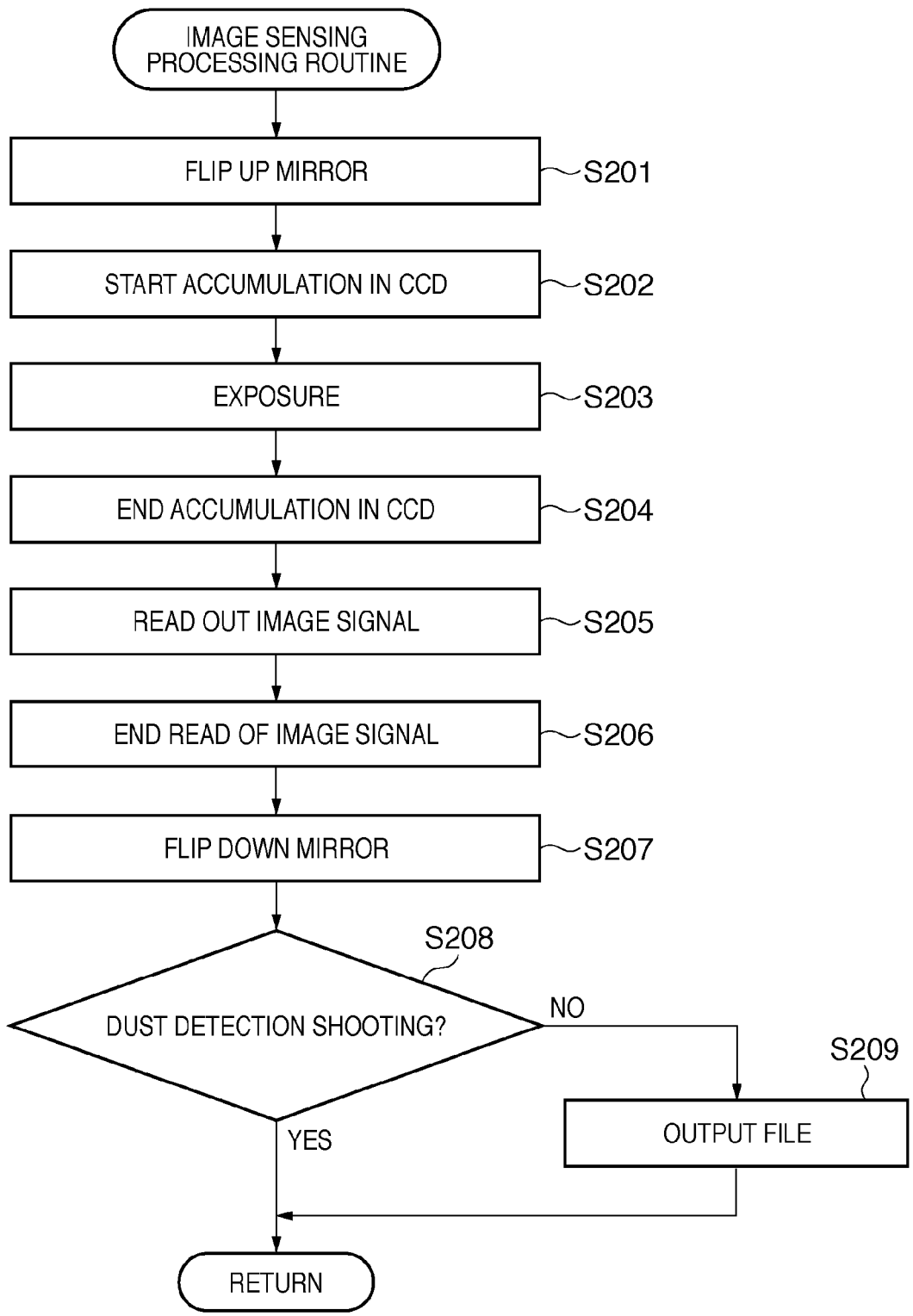
FIG. 9 is a flowchart for explaining details of an image sensing processing routine in step S24 of FIG. 4.

Details of the image sensing processing routine in step S24 of FIG. 4 will be explained with reference to the flowchart shown in FIG. 9. The system control circuit 50 performs this processing by executing an image sensing processing program stored in the nonvolatile memory 56.

When the image sensing processing routines starts, the system control circuit 50 operates the mirror 130 shown in FIG. 3 to flip it up and retract it from the imaging optical path in step S201.

In step S202, the image sensor 14 starts accumulating charges. In step S203, the shutter 12 shown in FIG. 3 travels to perform exposure. In step S204, the charge accumulation of the image sensor 14 ends. In step S205, an image signal is read out from the image sensor 14, and image data processed by the A/D converter 16 and image processing circuit 20 is temporarily stored in the memory 30.

In step S206, read of all image signals from the image sensor ends. In step S207, the mirror 130 flips down and returns to the inclined mirror position. Then, a series of image sensing operations ends.

In step S208, the system control circuit 50 determines whether the shooting mode is still image shooting or dust detection image shooting. If the shooting mode is still image shooting, the process advances to step S209 to record the shot still image on the recording medium 200.

The first embodiment is directed to a method of performing image processing to correct an image quality degraded by dust when shooting a moving image. Prior to a description of moving image processing, still image processing will be explained.

The sequence of an operation to perform dust removal for a still image file by image processing using the above-mentioned dust correction data will be explained with reference to FIG. 10.

A still image file to undergo dust removal processing is designated and loaded into an apparatus (which may be the image processing circuit 20 in the camera or an image processing apparatus outside the camera) for performing dust removal processing (step S1801).

The apparatus for performing dust removal processing obtains dust correction data created in step S65 of FIG. 6 (step S1802).

A coordinate sequence Di (i=1, 2, ..., n), a radius sequence Ri (i=1, 2, ..., n), an aperture value f1, and a lens pupil position L1 are obtained from the dust correction data obtained in step S1802 (step S1803). Ri represents the size of dust at the coordinates Di calculated instep S65 of FIG. 6. In step S1804, an aperture value f2 and lens pupil position L2 in shooting are obtained. In step S1805, Di is converted by the following equation. Converted coordinates Di' and a converted radius Ri' are defined by $$Di'(x,y)=(L2\times(L1-H)\times d/((L2-H)\times L1))\times Di(x,y)$$

$$Ri'=(Ri\times f1/f2+3) \quad (1)$$

where d is the distance from the image center to the coordinates Di, and H is the distance from the surface of the image sensor 14 to dust.

The unit is a pixel, and "+3" for Ri' means a margin.

In step S1806, dust in a region defined by the coordinates Di' and radius Ri' is detected, and if necessary, interpolation processing is applied. Details of the interpolation processing will be described later. In step S1807, it is determined whether all coordinates have undergone the dust removal processing. If it is determined that all coordinates have been processed, the process ends. If it is determined that all coordinates have not been processed, the process returns to step S1806.

Figure 11:
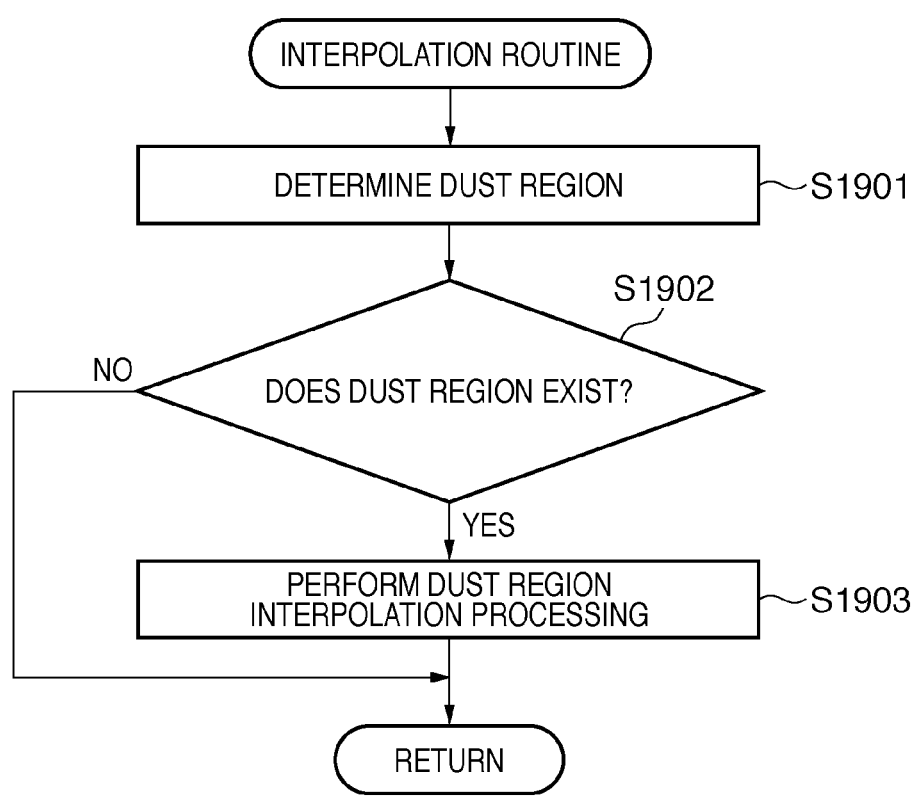
FIG. 11 is a flowchart for explaining details of an interpolation routine.

Details of the dust region interpolation processing will be explained. FIG. 11 is a flowchart showing the sequence of the interpolation routine.

Figure 10:
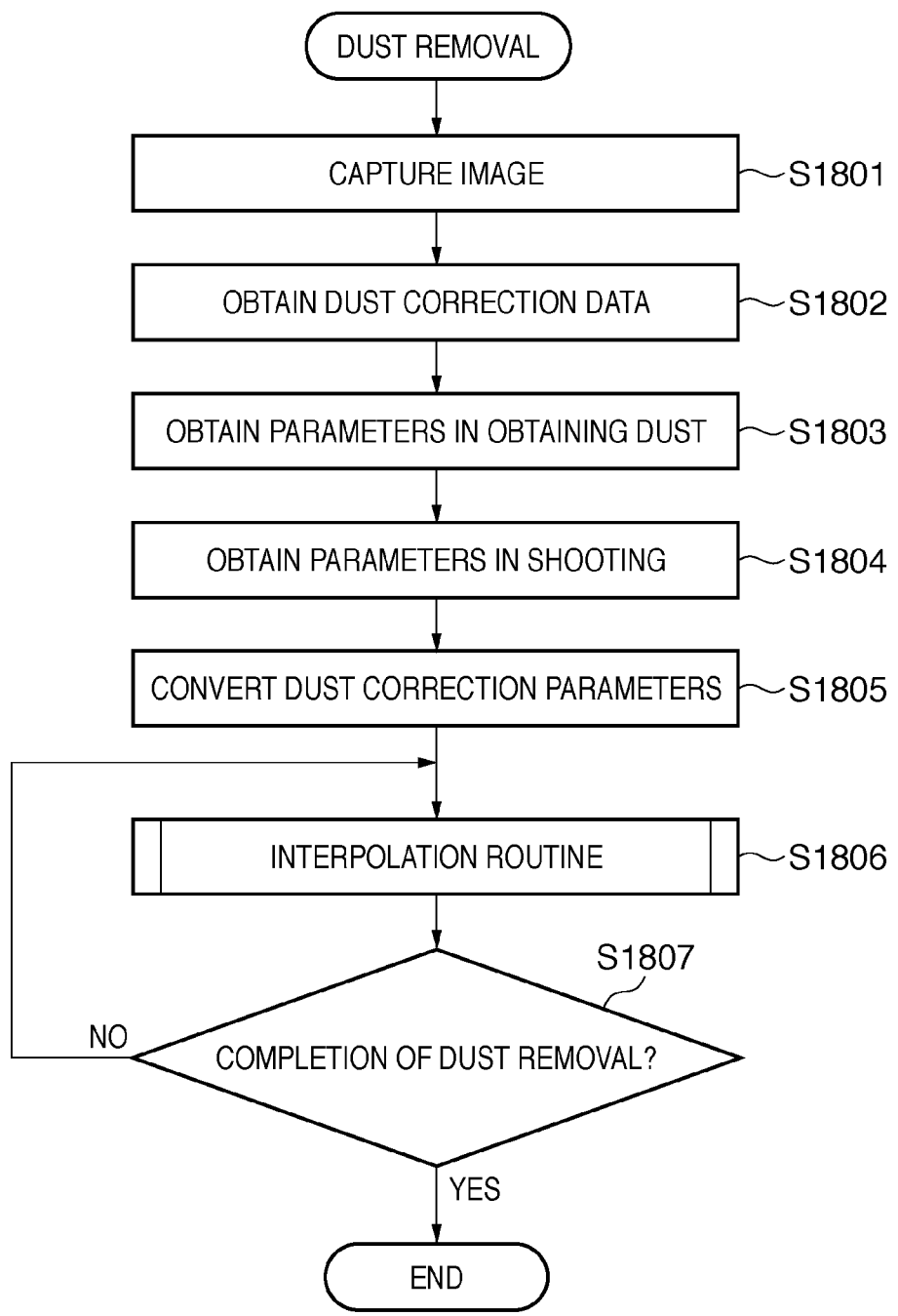
FIG. 10 is a flowchart for explaining details of dust removal processing.

In step S1901, determination of the dust region is done. The dust region is a region which satisfies all the following conditions:

(1) a region whose luminance is lower than a threshold value T2 calculated using an average luminance Yave and maximum luminance Ymax of pixels falling within a region defined by the center coordinates Di' and radius Ri' (Di' and Ri' calculated by equation (1)) calculated in step S1805 of FIG. 10:

$$T2=Yave\times 0.6+Ymax\times 0.4$$

(2) a region which does not contact a circle defined by the center coordinates Di' and radius Ri'.

(3) a region whose radius value calculated by the same method as step S63 in FIG. 6 is equal to or larger than x1 pixels and smaller than x2 pixels in an isolated region which is selected based on condition (1) and formed from low-luminance pixels.

(4) a region containing the center coordinates Di of the circle.

In the first embodiment, x1 represents three pixels, and x2 represents 30 pixels. With this setting, only a small isolated region can be handled as a dust region. When no lens pupil position can be accurately obtained, condition (4) may also be eased. For example, when the region of interest contains the coordinates of a range of ±3 pixels from the coordinates Di in both the X and Y directions, it is determined as a dust region.

If such a region exists in step S1902, the process advances to step S1903 to perform dust region interpolation. If no such region exists, the process ends. The dust region interpolation processing executed in step S1903 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S1901 is handled as a defective region, and interpolated by pattern replacement using normal surrounding pixels. For a pixel which cannot be interpolated by pattern replacement, p normal pixels are selected sequentially from one closest to the pixel to be interpolated in image data having undergone pattern correction, and the target pixel is interpolated using the average color of them.

Next, MP4 will be explained. The MP4 is a moving image file format used to record moving image data in recent digital cameras, digital video cameras, and the like.

The MP4 file format (see ISO/IEC 14496-14; "Information technology—Cording of audio-visual Objects—Part 14: MP4 file format"; ISO/IEC; 2003-11-24) is extended from a general-purpose file format "ISO Base Media File Format" (see ISO/IEC 14496-12; "Information technology—Cording of audio-visual Objects—Part 12: ISO base media file format"; ISO/IEC; 2004-01-23). The MP4 file format aims at recording files of moving image/audio contents data such as MPEG data standardized by ISO/IEC JTC1/SC29/WG11 (International Organization for Standardization/International Engineering Consortium). The first embodiment is applicable not only to MP4 but also to another similar file format. For example, ISO has established standards "Motion JPEG 2000 file format" (ISO/IEC 15444-3) and "AVC file format" (ISO/IEC 14496-15) as file format standards having the same basic structure as that of MP4.

Figure 12:
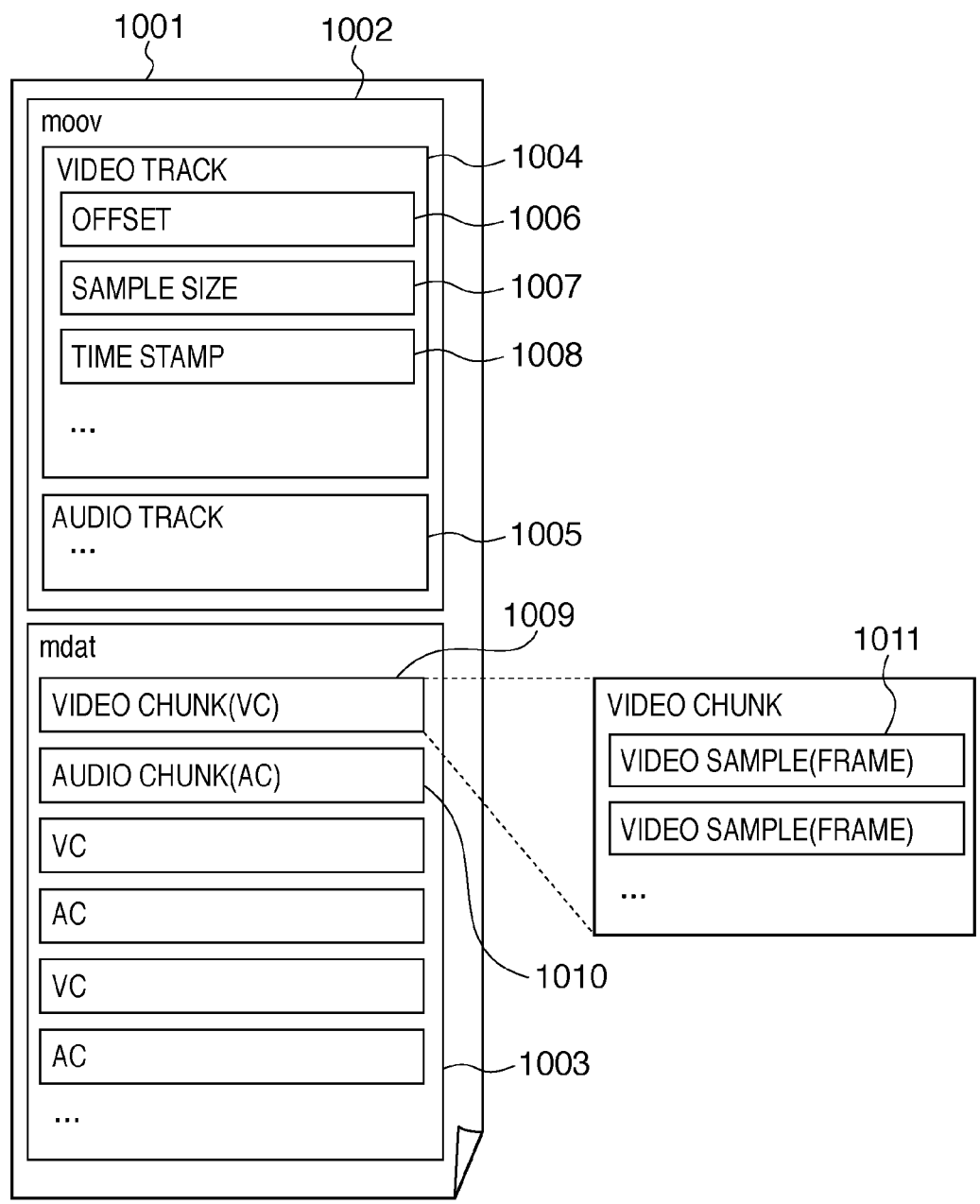
FIG. 12 is a view for explaining the concept of metadata and media data in the MP4 file format or a similar file format.

FIG. 12 is a conceptual view for explaining the data structure of the MP4 file format.

An MP4 file 1001 contains metadata (header information) 1002 representing the physical position, temporal position, and characteristic information of video and audio data, and media data 1003 representing the entities of encoded video and audio data. In the MP4 format, a presentation of whole contents is called a "movie", and that of a media stream which forms the contents is called a "track". The metadata 1002 typically contains a video track 1004 for logically handling entire moving image data, and an audio track 1005 for logically handling entire audio data. The video track 1004 and audio track 1005 have almost the same configuration contents. More specifically, respective tracks record various kinds of metadata information of actual media data. The contents are slightly different in accordance with the characteristic of media data.

Data contained in the video track 1004 include, for example, configuration information of a so-called decoder for decoding encoded data, and information on the rectangular size of a moving image. In addition, the data include an offset 1006 representing a position in a file where media data is actually recorded, and a sample size 1007 representing the size of each frame data (also called a picture) of media data. The video track 1004 also records a time stamp 1008 representing the decoding time of each frame data.

The media data 1003 records the entities of moving image data and audio data in a data structure "chunk" which successively records one or more "samples" representing the basic unit of encoded data. The chunk includes a video chunk 1009 containing media data of a moving image, and an audio chunk 1010 containing media data of audio data in accordance with the track of the metadata 1002.

In the structure shown in FIG. 12, the video chunk 1009 and audio chunk 1010 are alternately recorded (interleaved), but the recording positions and order are not limited to those shown in FIG. 12. The recording positions and order shown in FIG. 12 are merely an example of a general recording format. However, this interleave arrangement can improve the accessibility of data recorded in a file because moving image data and audio data to be played back almost simultaneously are arranged at close positions. Thus, the interleave arrangement is very popular.

The chunk contains one or more samples of each media data. For example, as shown in FIG. 12, the video chunk 1009 successively records video samples (frames) 1011. In general, each video sample (frame) 1011 corresponds to one frame data (picture) of video data. Each track and each chunk are associated as follows.

For example, for moving image data, information contained in the video track 1004 includes information on each video chunk 1009 contained in the media data 1003. The offset 1006 is formed from a table of information representing the relative position of the video chunk 1009 in a corresponding file. By looking up each entry of the table, the position of an actual video chunk can be specified regardless of where the video chunk is recorded. The sample size 1007 describes, in a table, the sizes of respective samples, i.e., video frames contained in a plurality of chunks. The video track 1004 also describes information on the number of samples contained in each chunk. From this information, samples contained in each video chunk 1009 can be obtained accurately. The time stamp 1008 records the decoding time of each sample in a table as the difference between samples. By looking up the table, a so-called time stamp of each sample can be obtained by calculating the accumulated time. The relationship between the track and the chunk is defined so that it is also similarly established between even the audio track 1005 and the audio chunk 1010. In the MP4 file format and ISO Base Media File Format, the metadata 1002 and media data 1003 can provide encoded data in a necessary unit from an arbitrary position together with additional information such as the time stamp. For descriptive convenience, not all pieces of standardized recording information have been described. Details of the definition contents of the standard can be acquired from a corresponding section of ISO/IEC 14496.

In the MP4 file format, data recorded in a file is described in a data structure "BOX". Data of each BOX is recorded in a file. The BOX is formed from the following fields:

Size: the size of the entire BOX including the size field itself.

Type: a 4-byte type identifier representing the type of BOX. In general, the type identifier is made up of four alphanumeric characters.

Other fields are options depending on BOX, so a description thereof will be omitted.

Data recorded in a file is held in a different type of BOX in accordance with the type of data. For example, the media data 1003 is recorded as Media Data BOX (the type field='mdat': When an identifier representing a BOX type is used in the following description, it expresses a BOX of this type). The metadata 1002 is recorded as a movie BOX 'moov' which stores metadata information of whole contents. Information on the above-described chunk and sample is also recorded as BOX having a unique identifier in moov for each track.

The MP4 file format not only records all metadata in moov, but also permits dividing metadata into a plurality of areas in time series and recording them. This format is called "Fragmented Movie".

Figure 13:
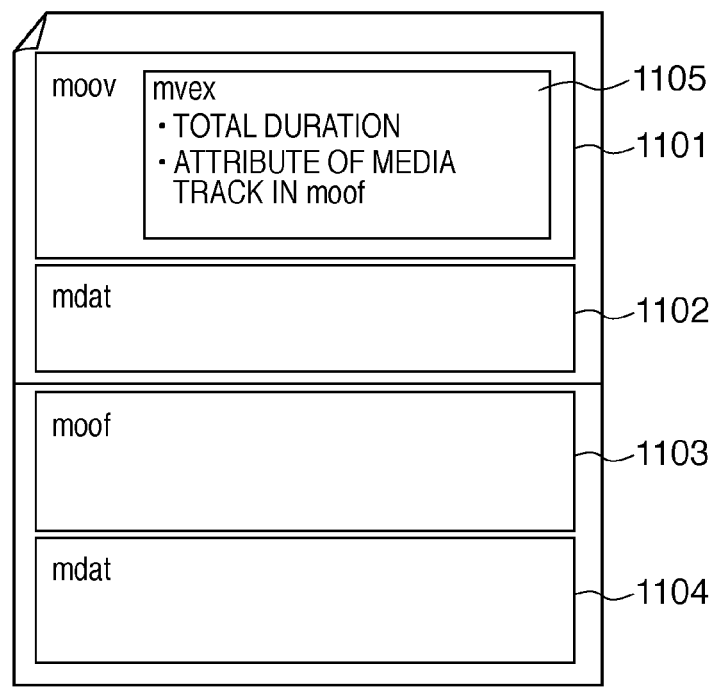
FIG. 13 is a view for explaining the concept of Fragmented Movie.

FIG. 13 shows the file structure of the fragmented movie format. The fragmented movie format allows dividing media data and metadata of contents by an arbitrary time. "Fragments" are recorded from the start of a file in time series. For example, in FIG. 13, moov 1101 represents metadata of the first fragment, and holds information on data contained in mdat 1102. moof 1103 subsequent to the mdat 1102 represents metadata of the second fragment, and holds information on mdat 1104. In this ways, fragments are recorded. When the fragmented movie format is employed, movie extends Box ('mvex') 1105 representing the presence of a fragment needs to be added to the moov 1101. Information contained in the mvex 1105 is, e.g., the duration (time length) of whole contents including all fragments. In a file of the MP4 file format, a variety of attributes associated with media data are held as a metadata area separately from the media data. Thus, desired sample data can be easily accessed regardless of how to physically store media data.

In the following description, the moving image file format used to record moving image data and audio data in the first embodiment is the MP4 fragmented movie format as shown in FIG. 13. A method of associating the above-described dust correction data with the video sample (frame) 1011 in moving image recording will be explained.

The method according to the first embodiment is also applicable to standards which adopt file formats and architectures similar to those defined in MP4, such as the standards "Motion JPEG 2000 file format" (ISO/IEC 15444-3) and "AVC file format" (ISO/IEC 14496-15), and a 3GPP (3rd Generation Partnership Project) file format serving as a moving image file which is constrained on the premise of the use on wireless terminals including third-generation cell phones (see 3GPP TS 26.244 "Technical Specification Group Services and System Aspects Transparent end-to-end packet switched streaming service (PSS); 3GPP file format (3GP) (Release 6)" 3rd Generation Partnership Project; 2003-02-28).

Figure 14:
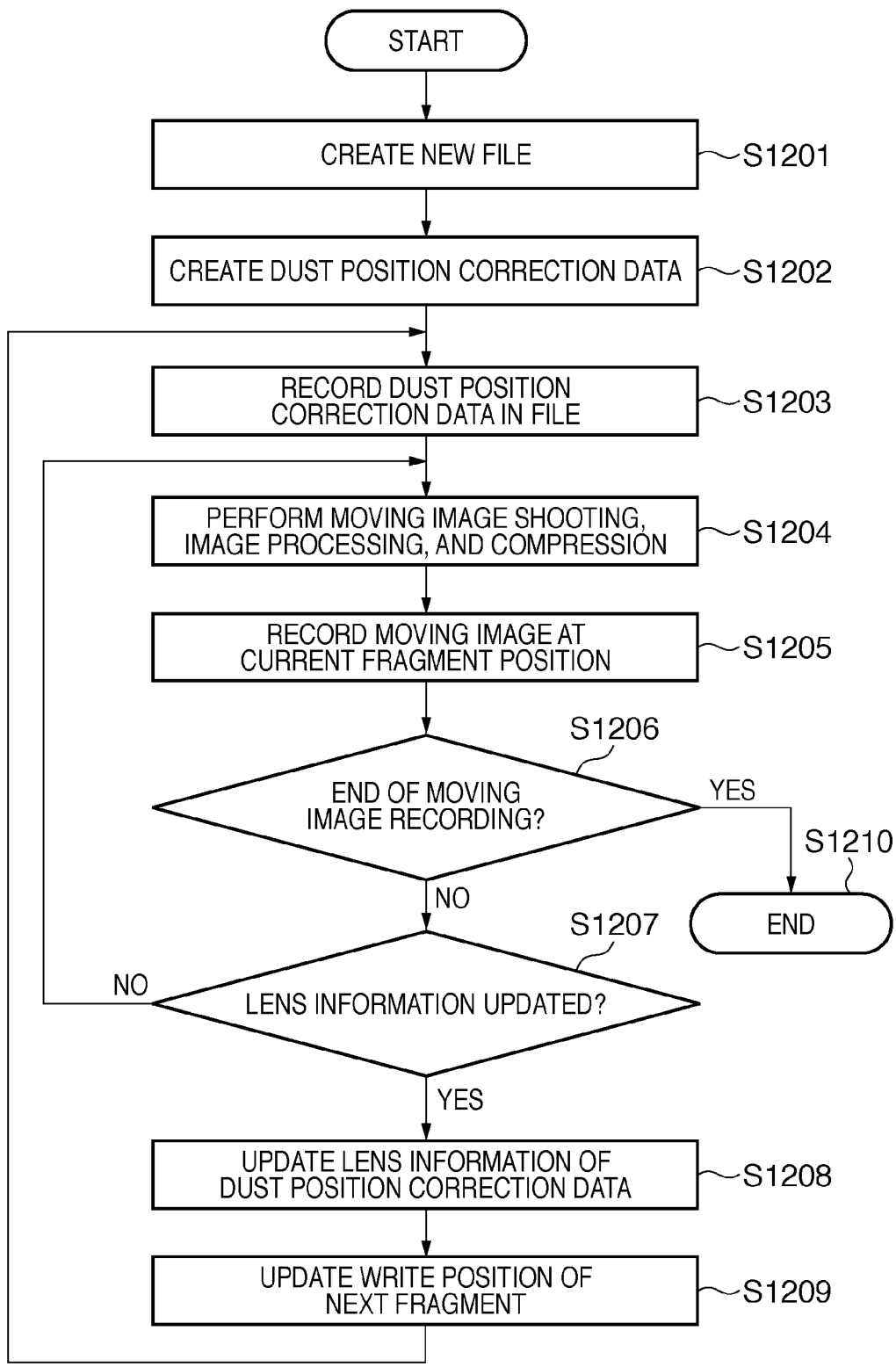
FIG. 14 is a flowchart of basic processing in the first embodiment.

FIG. 14 is a flowchart showing processing to associate dust correction data with the frame 1011 and record a moving image. The system control circuit 50 performs this processing by executing a moving image recording processing program stored in the nonvolatile memory 56. Assume that the nonvolatile memory 56 stores dust correction data. Also assume that the memory 30 has already stored an aperture value (F-number) and lens pupil position as lens information of a lens attached at the start of moving image shooting. The lens information is copied to the memory 52 at the start of moving image recording. The system control circuit 50 obtains the lens information by communicating with the lens unit 300.

To shoot a moving image, the user needs to change the shooting mode from a still image shooting mode to a moving image shooting mode using the menu button 124 or mode dial 60. When the moving image shooting mode is set, the system control circuit 50 flips up the mirror 130 to retract it from the imaging optical path. The system control circuit 50 opens the shutter 12 to expose the image sensor 14 to object light. Image data obtained by exposure are successively written at a predetermined rate in the memory 30 serving as a frame buffer. The LCD monitor 417 functions as an electronic viewfinder (EVF) to sequentially display the written image data. In the moving image shooting mode, the operation unit 70 detects whether the user has pressed the moving image recording start button (e.g., he has pressed the SET button 117 in the moving image shooting mode). If so, moving image shooting starts to sequentially record image data on the recording medium 200 in the MP4 file format.

Figures 15, 16:
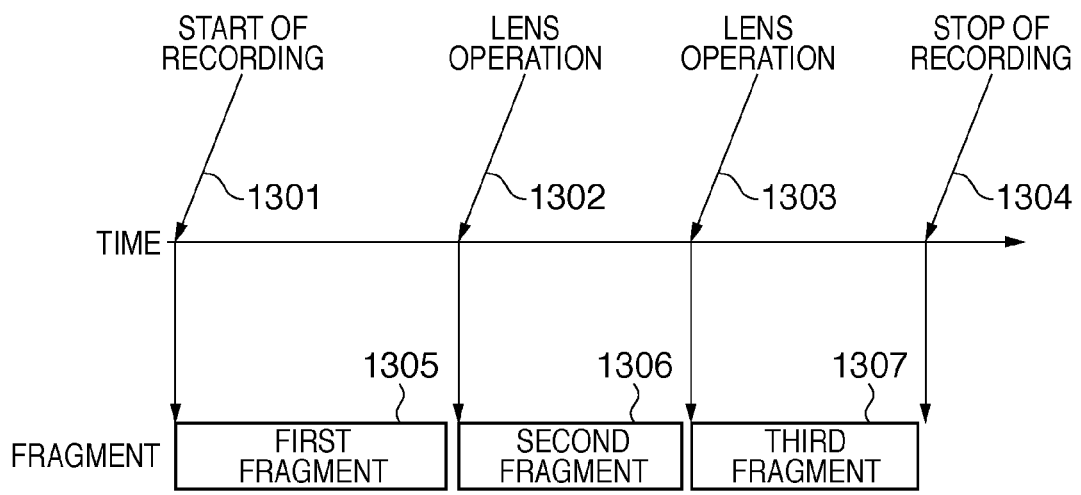
FIG. 15 is a view showing an example of the data format of dust position correction data.
FIG. 16 is a chart showing moving image file fragmentation/generation processing in the first embodiment.

Referring back to FIG. 14, when moving image shooting starts upon pressing the moving image recording button in the moving image shooting mode, a new file is generated first. moov serving as the BOX of metadata of the first fragment and mdat serving as the BOX of media data are created (step S1201). Then, dust position correction data is created (step S1202). FIG. 15 shows an example of the data format of the created dust position correction data.

As shown in FIG. 15, the dust position correction data stores an aperture value and lens pupil position information serving as lens information of a lens used in moving image shooting, and the dust correction data shown in FIG. 5. The memory 52 stores the created dust position correction data.

Figure 17A:
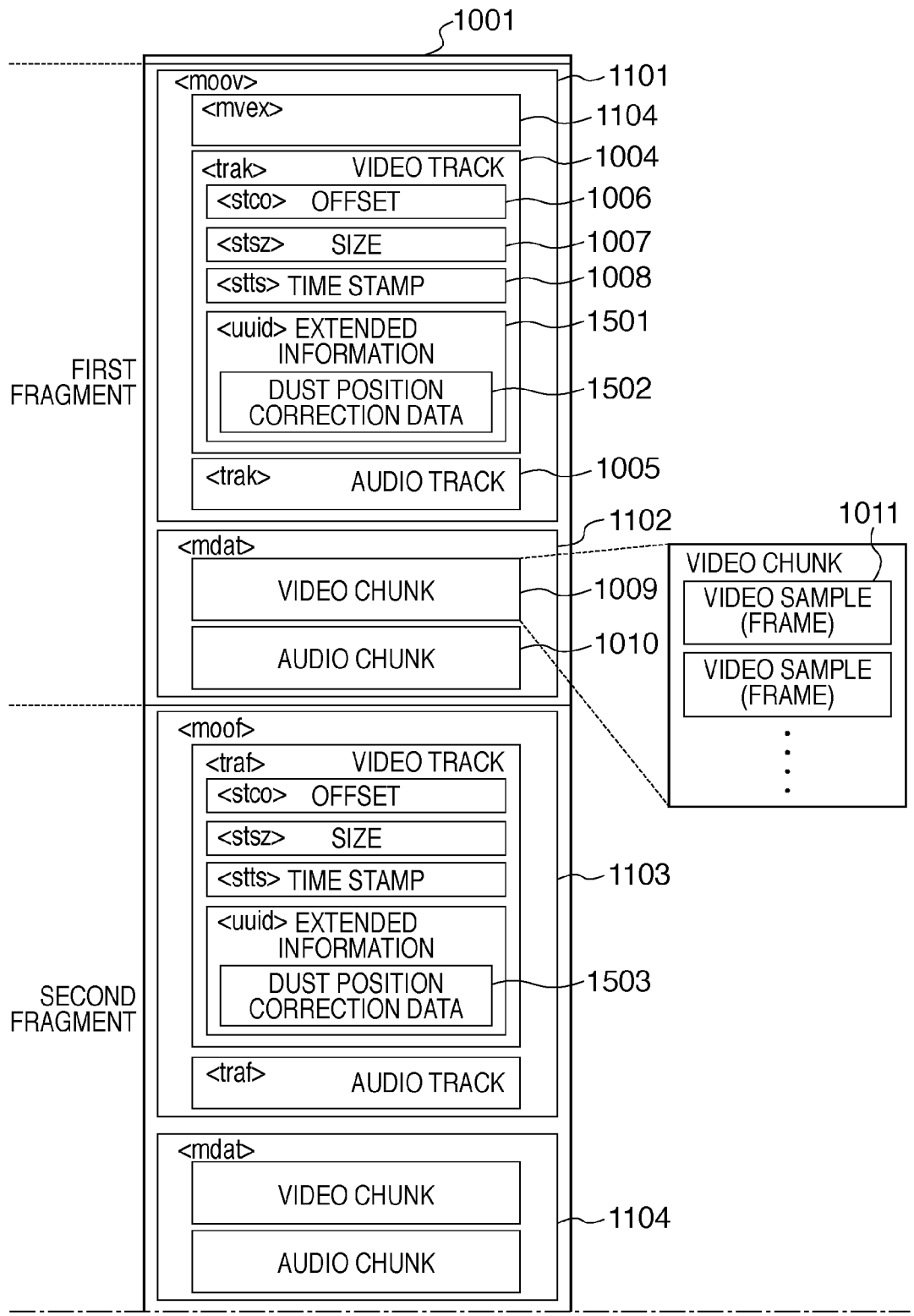
FIGS. 17A and 17B are a schematic view of a basic file structure in the first embodiment.

In step S1203, the dust position correction data stored in the memory 52 is read and written in the moov of metadata of the current fragment, like dust position correction data 1502 in FIG. 17A. In this case, the system control circuit 50 functions as an information recording unit and fragment information storage unit. Note that the data structure in FIGS. 17A and 17B will be described later.

After moving image shooting, image processing, and compression processing (step S1204), moving image data is written in mdat of the current fragment (step S1205). In this case, the system control circuit 50 functions as a fragment recording unit.

Then, it is determined whether the user has requested the end of moving image recording, i.e., he has pressed a moving image recording stop button (e.g., he has pressed the SET button 117 during moving image recording) (step S1206). If the user has requested the end of moving image recording, the process ends (step S1210). If the user has not requested the end, it is checked whether lens information has been updated (step S1207). The lens information is updated upon a change of the lens pupil position when the user operates the lens to zoom in/out the object image, or a change of the aperture value by the user with an operation member such as the electronic dial 411. The zoom control unit 344 notifies the system control circuit 50 of a change of the pupil position via the connectors 322 and 122. Also, the system control circuit 50 is notified of a change of the aperture value as signals of many switches including the electronic dial 411. In this case, the zoom control unit 344 and operation unit 70 function as a lens information update notification unit.

Upon receiving the notification, the system control circuit 50 functions as a lens information obtaining unit. The system control circuit 50 stores the notified current lens information in the memory 30, and rewrites it over lens information stored in the memory 52. When the photometry control unit 46 detects an abrupt change of the brightness of an object, it notifies the system control circuit 50 of this. Then, the system control circuit 50 causes the stop control unit 340 to drive and control the aperture blades. The system control circuit 50 obtains notified lens information. When the lens pupil position changes upon auto focus (AF) driving of the lens, driving of an anti-vibration shift lens for preventing camera shake, or the like, the zoom control unit 344 and focus control unit 342 notify the system control circuit 50 of this, and the system control circuit 50 obtains lens information.

If update of the lens information is detected, the lens information to be stored in the memory 52 overwrites an aperture value and lens pupil position used when the dust position correction data was obtained (FIG. 15) (step S1208). moof serving as the BOX of metadata of a new fragment and mdat serving as the BOX of media data are added to the current fragment during the write, updating the fragment in which the write position is created (step S1209). In this case, the system control circuit 50 functions as a fragment creation unit and fragment change control unit. Thereafter, the process returns to step S1203 to write the dust position correction data updated in step S1208 in moof of metadata of the added fragment, like dust position correction data 1503 in FIG. 17A.

If no update of lens information is detected in step S1207, moving image shooting, image processing, and compression processing are performed (step S1204) without fragmentation. Moving image data is written in mdat of the current fragment (step S1205).

The series of processes (steps S1203, S1204, S1205, S1206, S1207, S1208, and S1209) is repeated until the user issues an end request.

Although not described in detail, a moving image file created upon receiving an end request (step S1210) records various kinds of metadata information in moov and moof of respective fragments, mvex necessary for the fragment format, and media data in mdat so as to be compatible with the standard.

In this example, dust position correction data is recorded for each fragment. However, dust correction data does not change during moving image shooting. For this reason, dust position correction data may also be recorded in only moov of the first metadata in the format of FIG. 15. In this case, only an aperture value and lens pupil position during shooting, which change during moving image shooting, are recorded in moof of metadata after fragmentation.

FIG. 16 is a chart showing an example of fragmentation of a generated moving image file. Recording starts at time 1301 and stops at time 1304. Fragmentation events upon detecting changes of lens information such as zoom-in/out and a change of the aperture value occur at time 1302 and time 1303. A first fragment 1305 stores dust position correction data including lens information, and moving image data from the recording start time 1301 to the time 1302 when the first fragmentation event occurs.

When the first fragmentation event occurs (the time 1302), a second fragment 1306 is generated as a new fragment. The second fragment 1306 stores dust position correction data including lens information, and moving image data from the first fragmentation event generation time 1302 to the second fragmentation event generation time 1303.

When the second fragmentation event occurs (the time 1303), a third fragment 1307 is generated as a new fragment. The third fragment 1307 stores dust position correction data including lens information, and moving image data from the second fragmentation event generation time 1303 to the time 1304 when the user requests the stop of recording.

In this way, one moving image file with a plurality of fragments such as the first fragment 1305, second fragment 1306, and third fragment 1307 generated every time a change of lens information is detected is created.

Instead of one moving image file, not new fragments but new moving image files may also be created at the timings of fragmentation events (the time 1302 and time 1303). When creating a new moving image file, a new file is created in step S1209. In step S1203, dust position correction data is always added to moov of metadata. In step S1210, a plurality of moving image files are generated.

Figure 17B:
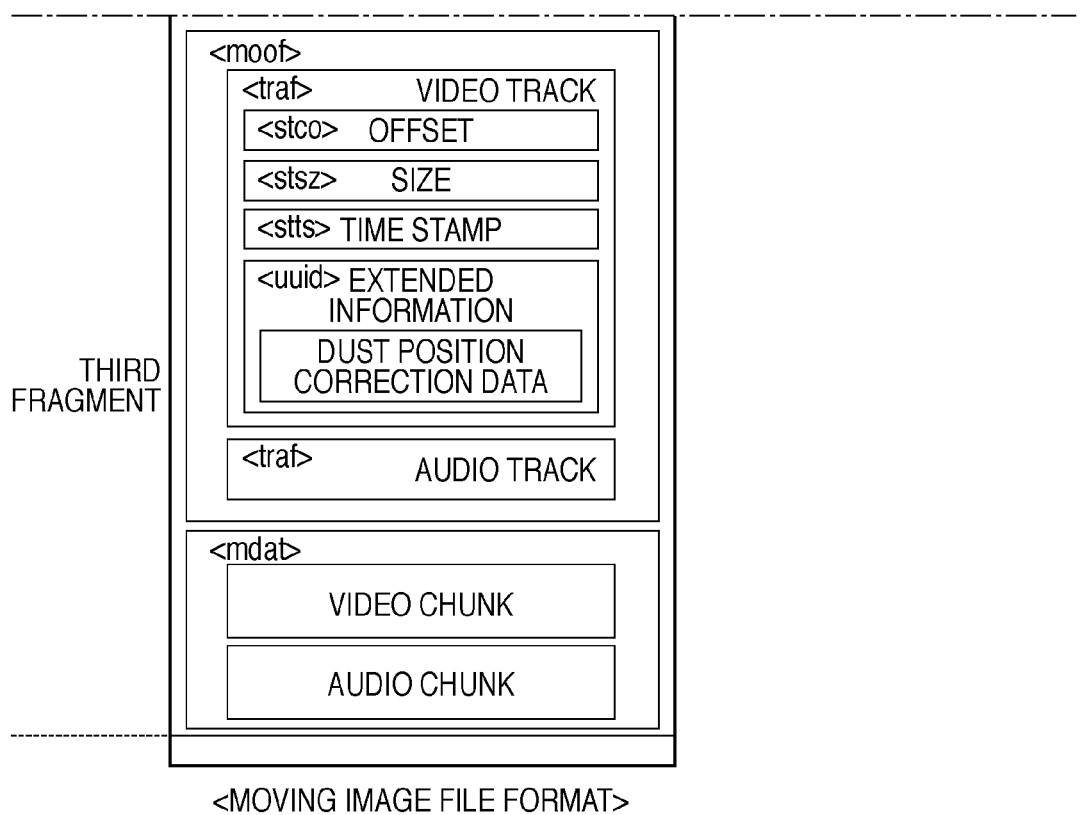

FIGS. 17A and 17B are a schematic view for explaining the data structure of the MP4 file format in the first embodiment. FIGS. 17A and 17B are a schematic view when two fragmentation events (the time 1302 and time 1303) shown in FIG. 16 occur to change lens information and generate three fragments in a moving image file.

Referring to FIG. 17A, the dust position correction data 1502 is added to the video track 1004 in order to associate dust correction data with each frame of a moving image. The MP4 file format permits recording data unique to a system by using an extended BOX with a type 'uuid', or using User Data Box ('udta').

With this mechanism, uuid 1501 is set in the video track of moov or moof of each fragment to write dust position correction data as unique data, as shown in FIG. 17A. The dust position correction data is stored in association with each frame until lens information is updated.

Figure 18A:
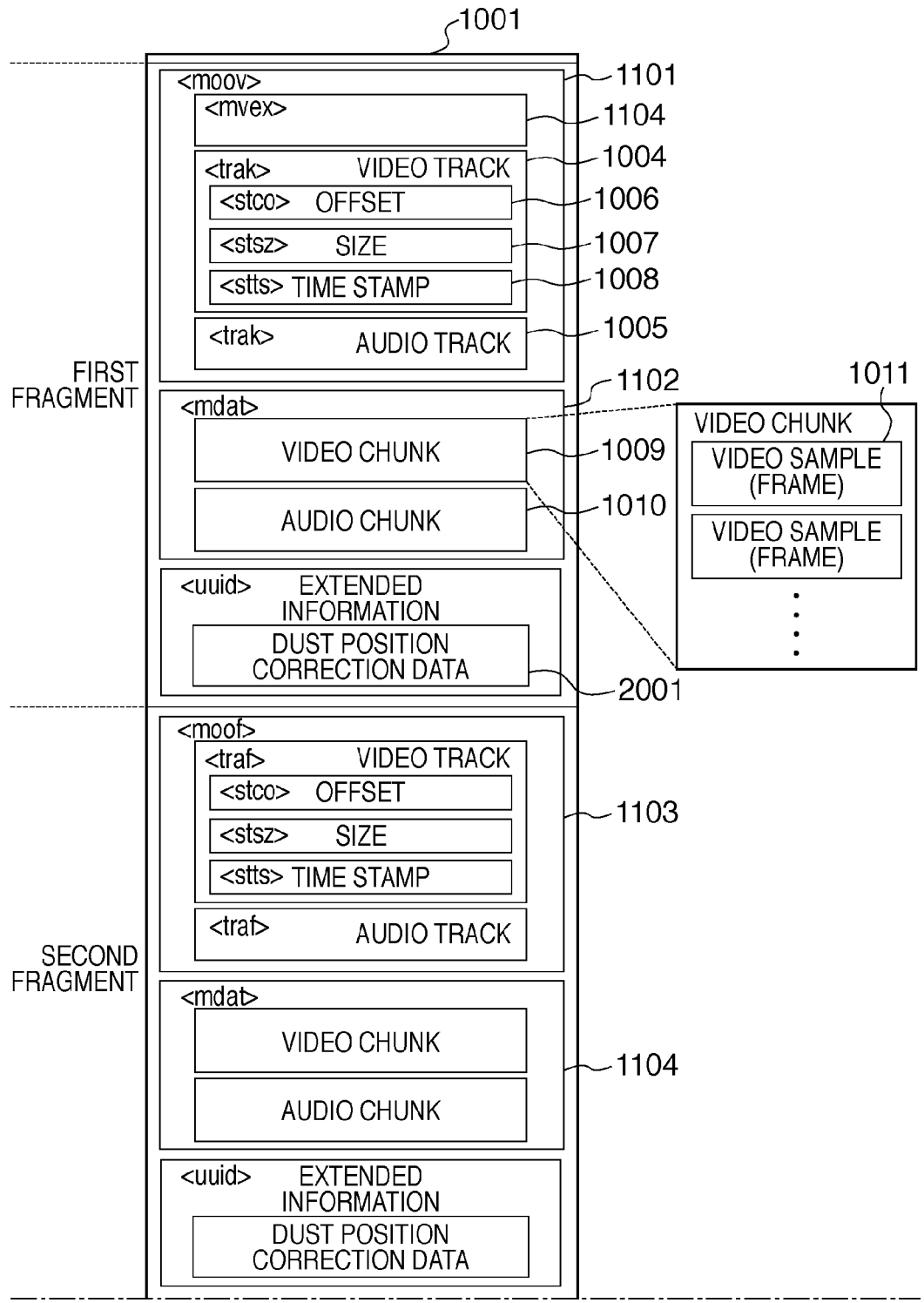
FIGS. 18A and 18B are a schematic view showing the second example of the file structure in the first embodiment.
Figure 18B:
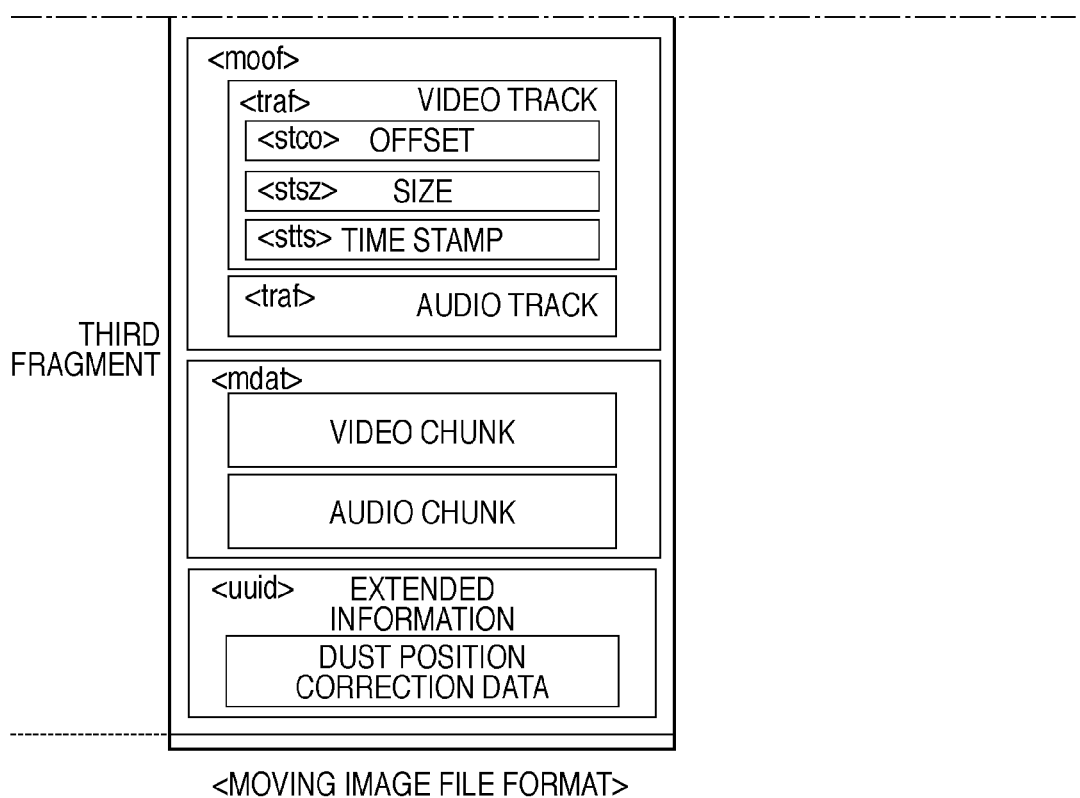

The MP4 file format also permits not only recoding 'uuid' in the video tracks of moov and moof, but also recording it in parallel to media data and metadata, like 'uuid' 2001 in FIG. 18A. Dust position correction data may also be recorded as shown in FIGS. 18A and 18B.

Figure 19A:
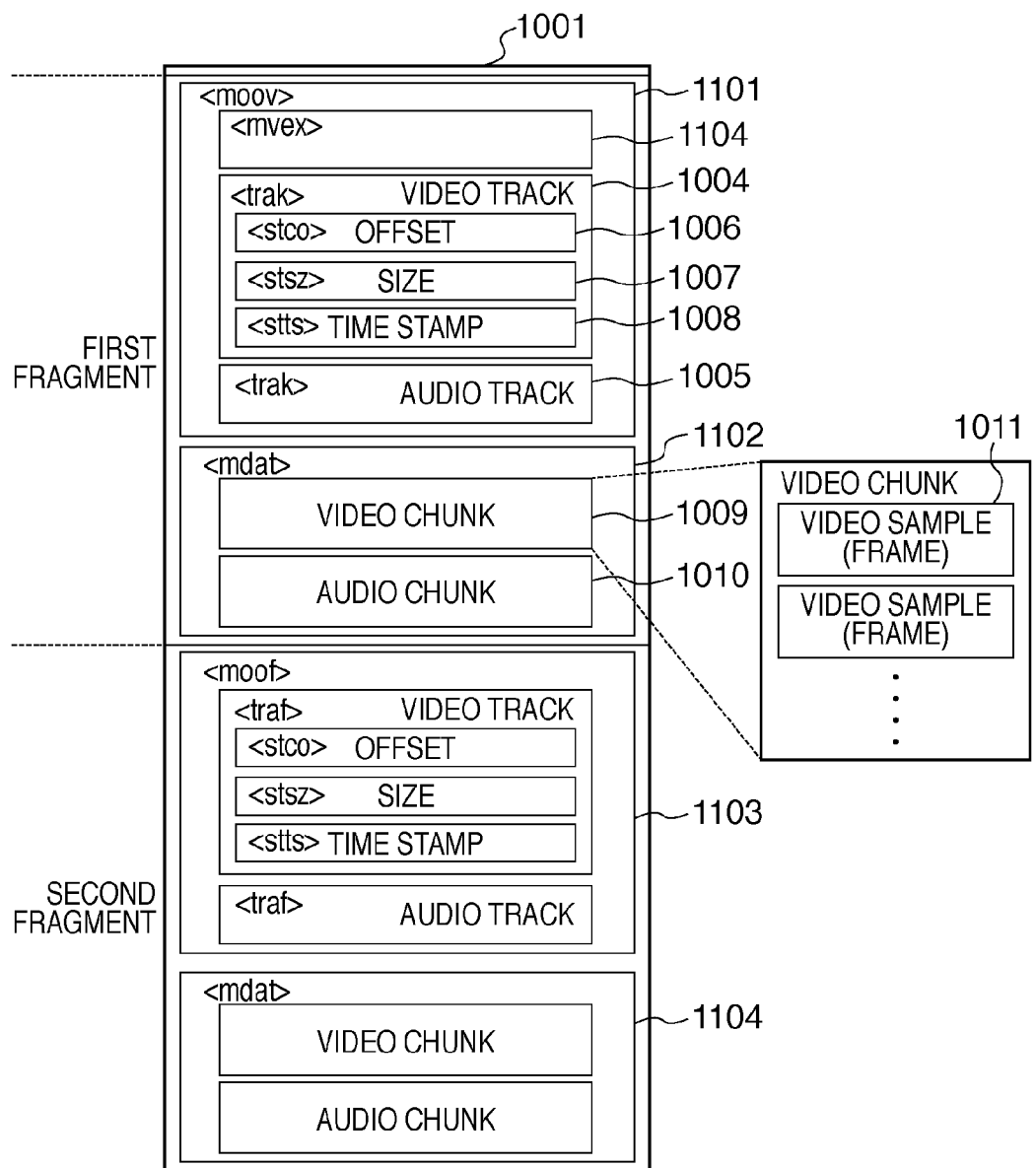
FIGS. 19A and 19B are a schematic view showing the third example of the file structure in the first embodiment.
Figure 19B:
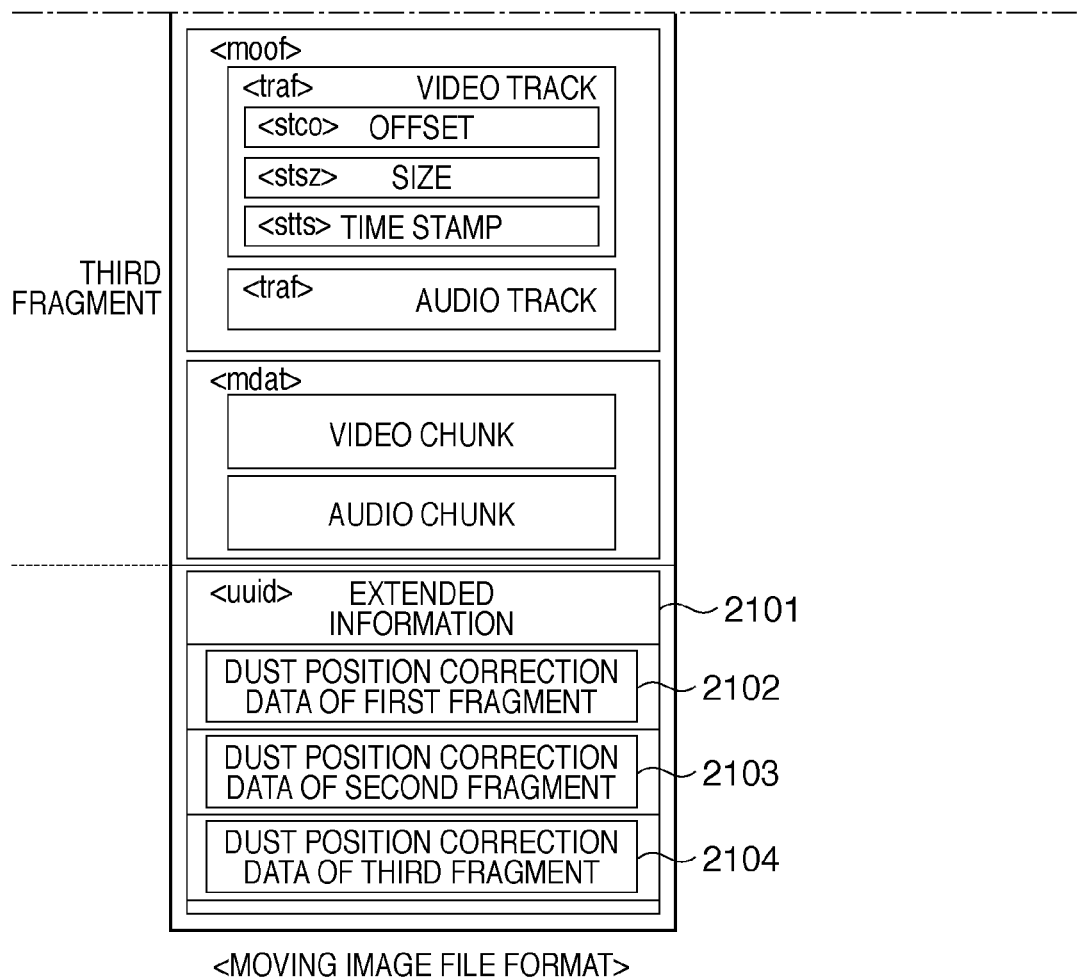

As shown in FIG. 19B, 'uuid' 2101 may also be set at the end of a moving image file. In this case, dust position correction data 2102, 2103, and 2104 corresponding to the first, second, and third fragments are described in time series.

Figure 20B:
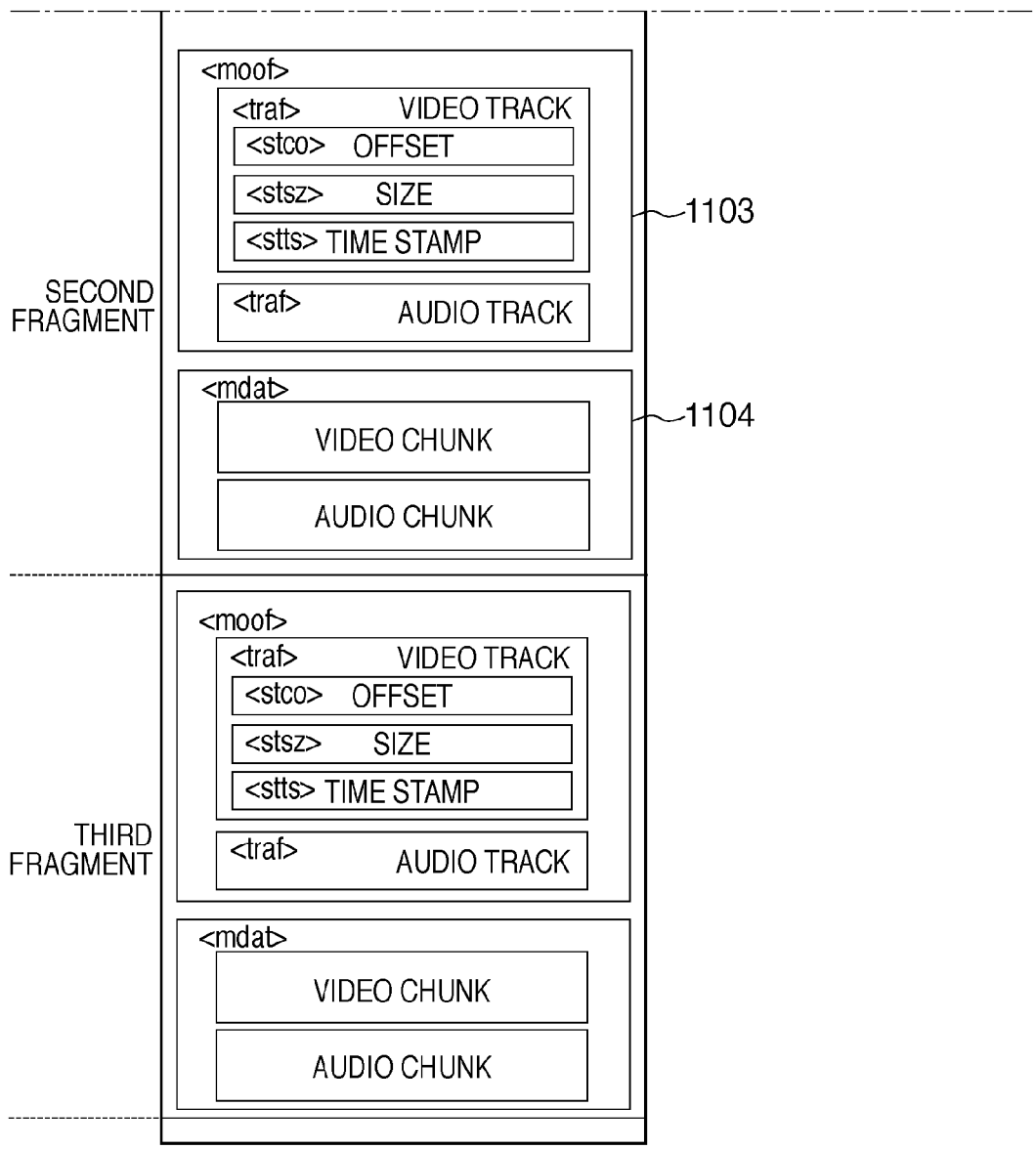

Dust position correction data may also be stored as a separate file, like a dust position correction data file 2201 in FIG. 20A. In this case, in order to associate the MP4 file 1001 with the dust position correction data file 2201, they need to have the same file name with different extensions, as shown in FIGS. 20A and 20B. Alternatively, the MP4 file 1001 needs to describe the name of the dust position correction data file as unique data udta. Needless to say, udta can also record dust position correction data.

The sequence of dust removal processing for a moving image file containing dust position correction data will be explained. A case wherein dust removal processing in FIG. 10 is applied to a moving image in a separately prepared image processing apparatus will be described. Only a difference when performing the removal processing in FIG. 10 for a moving image file with the file format in FIGS. 17A and 17B will be explained.

Figure 21:
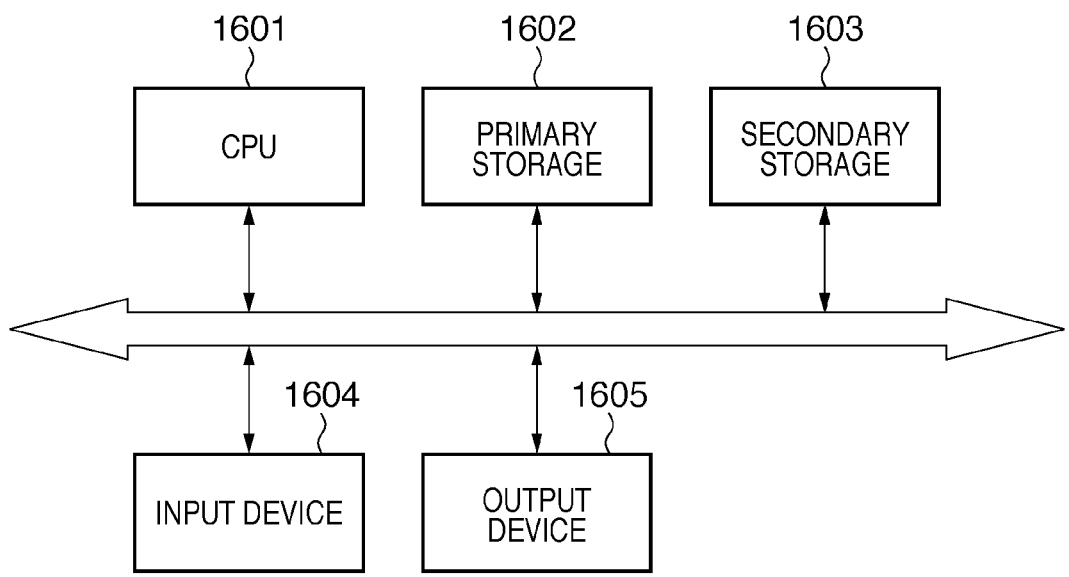
FIG. 21 is a block diagram showing the schematic system configuration of an image processing apparatus.

FIG. 21 is a block diagram showing the schematic system configuration of the image processing apparatus. A CPU 1601 controls the overall system, and executes a program stored in a primary storage 1602. The primary storage 1602 is mainly a memory. The primary storage 1602 loads a program from a secondary storage 1603, and stores it. The secondary storage 1603 is, e.g., a hard disk. In general, the primary storage is smaller in capacity than the secondary storage. The secondary storage stores programs, data, and the like which cannot be completely stored in the primary storage. The secondary storage also stores data which need to be stored for a long time. In the first embodiment, the secondary storage 1603 stores programs. When executing a program, it is loaded to the primary storage 1602 and executed by the CPU 1601.

An input device 1604 includes a mouse and keyboard used to control the system, and a card reader, scanner, and film scanner necessary to input image data. An output device 1605 is, e.g., a monitor or printer. The apparatus can take other various arrangements, but this is not a gist of the present invention and a description thereof will be omitted.

The image processing apparatus incorporates an operating system capable of parallel-executing a plurality of programs. The user can use a GUI (Graphical User Interface) to operate a program running on the apparatus.

Figure 22:
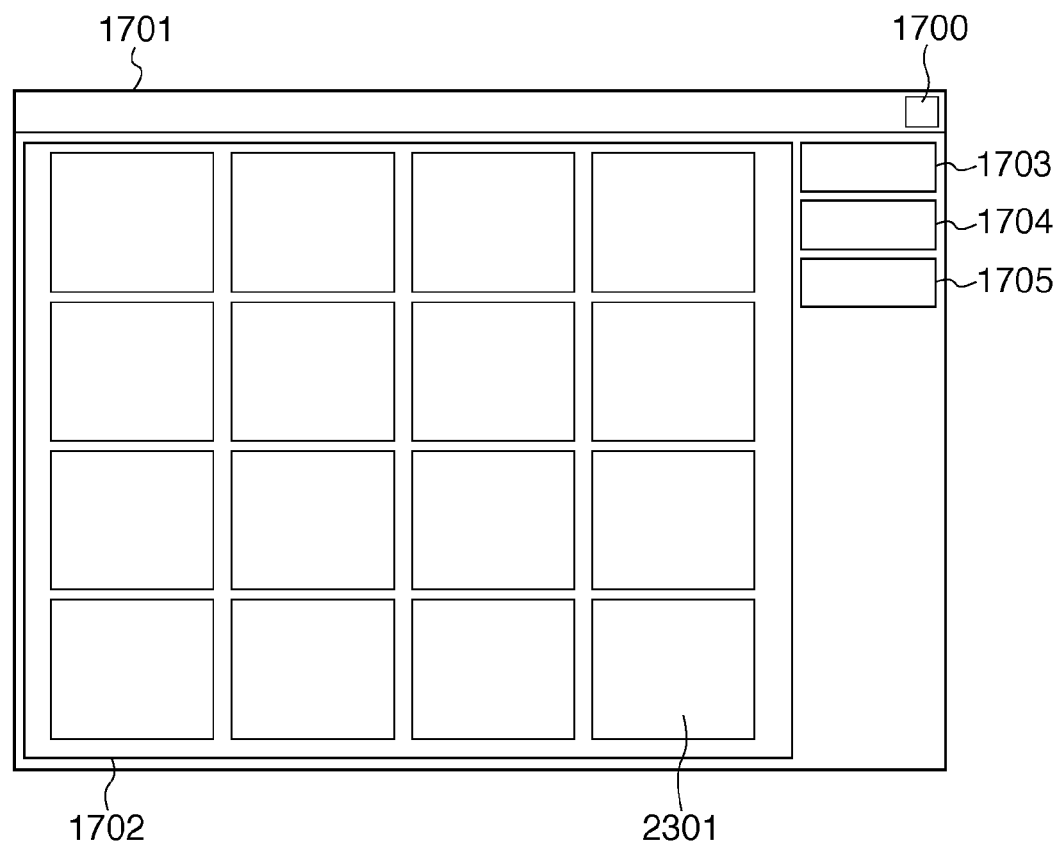
FIG. 22 is a view showing an example of the GUI in the image processing apparatus.

FIG. 22 is a view showing the GUI of an image edit program in the image processing apparatus. The window has a close button 1700 and title bar 1701. The user ends the program by pressing the close button. The user designates a moving image file to be corrected by dragging and dropping it to an image display area 1702. When an image to be corrected is determined, the title bar 1701 displays the file name. When the user designates a moving image file to be corrected, the image display area 1702 displays first frames 2301 of respective fragments side by side as thumbnails. The user clicks and selects the first frame of a displayed fragment. Then, the image display area 1702 displays all frames in the fragment including the first frame side by side as thumbnails. The user clicks and designates a frame to undergo dust removal processing among all the frames displayed as thumbnails. The frame to be corrected is displayed to be fitted in the image display area 1702. When the user presses an execution button 1703, dust removal processing (to be described later) is executed. The image display area 1702 displays the processed image. When the user presses a step execution button 1704, a step of the dust removal processing (to be described later) is executed. At the end of processing all dust regions, the image display area 1702 displays the processed image. When the user presses a save button 1705, the target frame is replaced with the processed one to save the resultant moving image file.

The method of designating a frame to be corrected by dust removal processing is not limited to this. For example, when the user designates a moving image file to be corrected, all frames may also be displayed first as thumbnails, like the first frames 2301, to prompt the user to select a frame to be corrected. The user may also designate a fragment while fragments are displayed as thumbnails. In this case, all frames in the designated fragment are automatically extracted one by one. As frames to be corrected, the extracted frames sequentially undergo dust removal processing. Alternatively, the user may designate a moving image file. Also in this case, all frames are automatically extracted one by one. As frames to be corrected, the extracted frames sequentially undergo dust removal processing.

As described above, the user designates a frame to be corrected by dust removal processing. This corresponds to step S1801 in FIG. 10. Then, the dust position correction data 1502 added to a fragment containing the designated frame to be corrected is obtained. This corresponds to step S1802. Dust correction data is extracted from the obtained dust position correction data 1502 to perform processing in step S1803. In step S1804, an aperture value and lens pupil position in shooting are obtained from the dust position correction data. Step S1805 is executed based on the information. In step S1806, correction processing is repetitively done until dust removal is completed (step S1807).

The dust removal processing using a separately prepared image processing apparatus has been described, but the dust removal processing may also be done within the digital camera body. When performing dust removal processing in the digital camera body, the system control circuit 50 performs the same processing as that shown in the flowchart of FIG. 10 by executing a dust removal processing program stored in the nonvolatile memory 56. For example, when the user designates the start of dust removal processing with the four-way selector switch 116, the system control circuit 50 reads out still image data stored in the memory 30 to the image processing circuit 20. The image processing circuit 20 performs the processing shown in FIG. 10, and executes dust pixel interpolation processing. Finally, the recording medium 200 records the interpolation processing result as a new moving image file.

As described above, a moving image file is fragmented at a timing when lens information such as the aperture value or lens pupil position changes. Dust position correction data including lens information and dust position information during shooting is attached to each fragment. This structure obviates the need to pay attention to the correspondence between dust position correction data and each frame in a moving image file. Dust position correction data is compact data formed from the dust position, size, and conversion data (aperture value and lens pupil position information), and does not excessively increase the size of media data such as moov and moof. Interpolation processing is done for only a region containing pixels designated by dust position correction data, so the probability of detection errors can greatly decrease.

(Second Embodiment)

In the first embodiment, a moving image file is fragmented every time lens information is updated upon a lens operation during moving image shooting. The second embodiment will explain a method of fragmenting a moving image file in accordance with the change amount of lens information.

Figure 23:
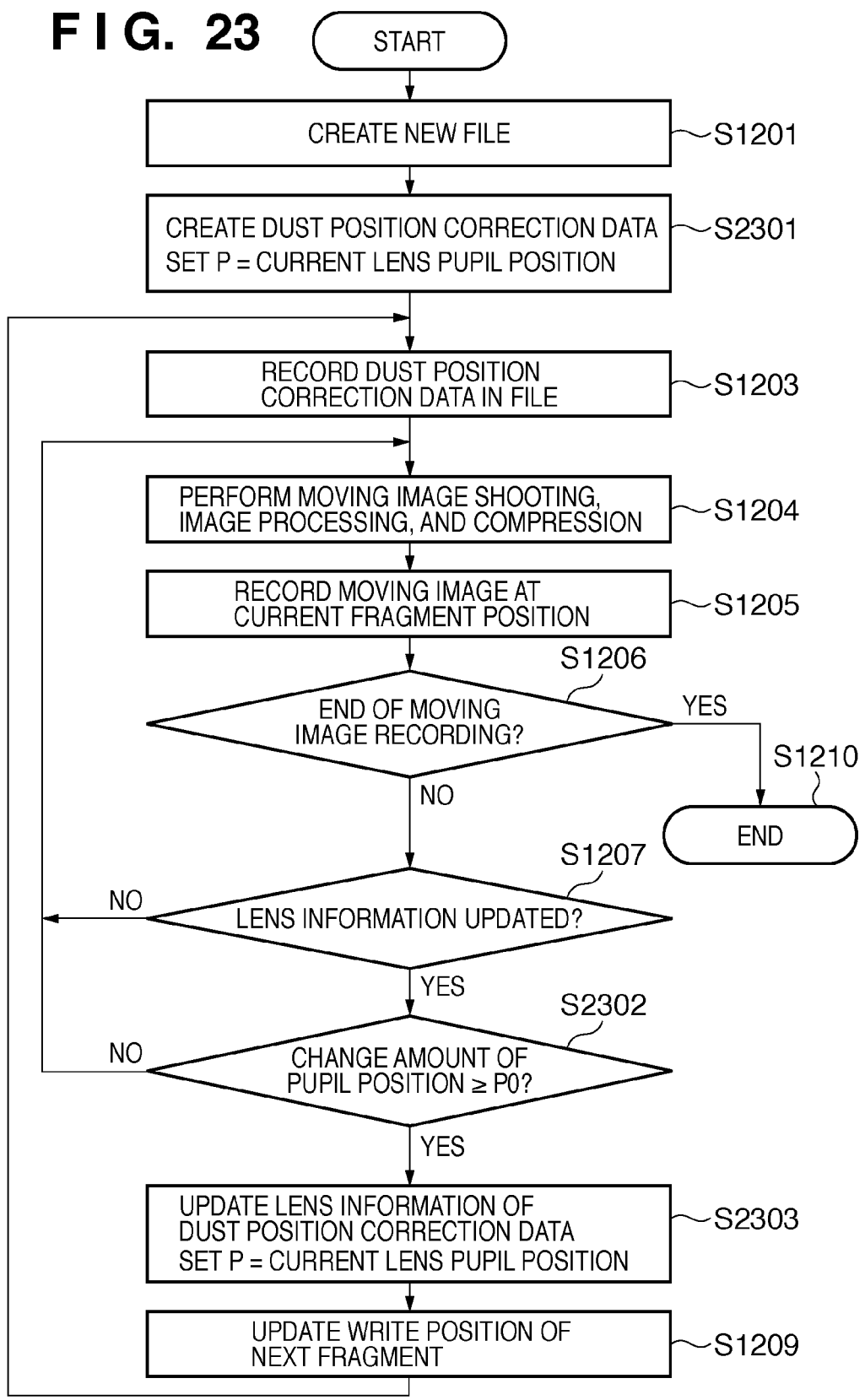
FIG. 23 is a flowchart of basic processing in the second embodiment.

FIG. 23 is a flowchart showing control to fragment a moving image file in accordance with the change amount of lens information. The same step numbers as those in FIG. 14 denote the same operations as those in FIG. 14, and a difference from FIG. 14 will be mainly explained.

When moving image shooting starts, a new file is created (step S1201), and dust position correction data is created (step S2301). At this time, a memory 52 stores, as P, a lens pupil position in the current lens information.

The file stores the created dust position correction data (step S1203). In step S1204, moving image shooting, image processing, and compression processing are performed to store the moving image in the file (step S1205).

In step S1206, it is checked whether the user has requested the end of moving image recording. If the user has not requested the end, it is checked whether the lens information has been updated (step S1207).

If the lens information has been updated, a lens pupil position in the updated lens information is compared with P stored in step S2301 to check whether the change amount of the lens pupil position is equal to or larger than a predetermined value P0, i.e., the change amount≥P0 (step S2302). P0 is an arbitrary value, or a range in which the center coordinates Di' are not greatly different between the pupil position P and an updated pupil position when the center coordinates of dust are calculated using equation (1) in step S1804 of FIG. 10. When the change amount≥P0, the center coordinates Di' greatly change if it is calculated using P in step S1804. In dust region determination (step S1901 in FIG. 11), none of the conditions are satisfied, and it is determined that dust does not exist though it actually exists. To prevent this, the lens information in the dust position correction data is overwritten to set the current lens pupil position as P (step S2303).

In step S1209, the fragment position is updated, and the process returns to step S1203. If the change amount<P0, no fragmentation is executed, and the process returns to step S1204 to perform moving image shooting, image processing, and compression processing.

In the above description, the change amount of the lens pupil position is obtained. Instead, the change amount of the lens aperture value or a combination of these two change amounts may also be obtained.

As described above, the moving image file is fragmented in accordance with the change amount of lens information. This can prevent an increase in the size of a moving image file and deterioration of file accessibility in playback that are caused by unnecessary file fragmentation.

(Third Embodiment)

In the third embodiment, the contents described with reference to FIGS. 1 to 13 are the same as those in the first embodiment.

The operation of the third embodiment will be explained.

(Moving Image Shooting Routine)

An operation in moving image shooting in the third embodiment will be described.

A system control circuit 50 performs this processing by executing a moving image shooting processing program stored in a nonvolatile memory 56.

To shoot a moving image, the user needs to change the shooting mode from a still image shooting mode to a moving image shooting mode using a mode dial 60 or the like.

When the moving image shooting routine starts, the system control circuit 50 operates a quick return mirror 130 shown in FIG. 3 to flip it up and retract it from the imaging optical path. The system control circuit 50 opens a shutter 12 to expose an image sensor 14 to object light. Image data obtained by exposing the image sensor 14 are successively written at a predetermined rate in a memory 30 serving as a frame buffer. An LCD monitor 417 functions as an electronic viewfinder (EVF) to sequentially display the written image data. In the moving image shooting mode, it is detected whether the user has pressed the moving image recording start button (e.g., he has pressed a SET button 117 in the moving image shooting mode). If so, moving image shooting starts to sequentially record image data on a recording medium 200 in the MP4 file format.

When moving image shooting starts upon pressing the moving image recording button in the moving image shooting mode, a new file is generated first. moov serving as the BOX of metadata of the first fragment and mdat serving as the BOX of media data are created.

Then, dust position correction data is created. The dust position correction data stores an aperture value and lens pupil position information serving as lens information of a lens used in moving image shooting, and the dust correction data shown in FIG. 5. A memory 52 stores the created dust position correction data. The dust position correction data stored in the memory 52 is read and written in the moov of metadata of the current fragment.

Figure 24:
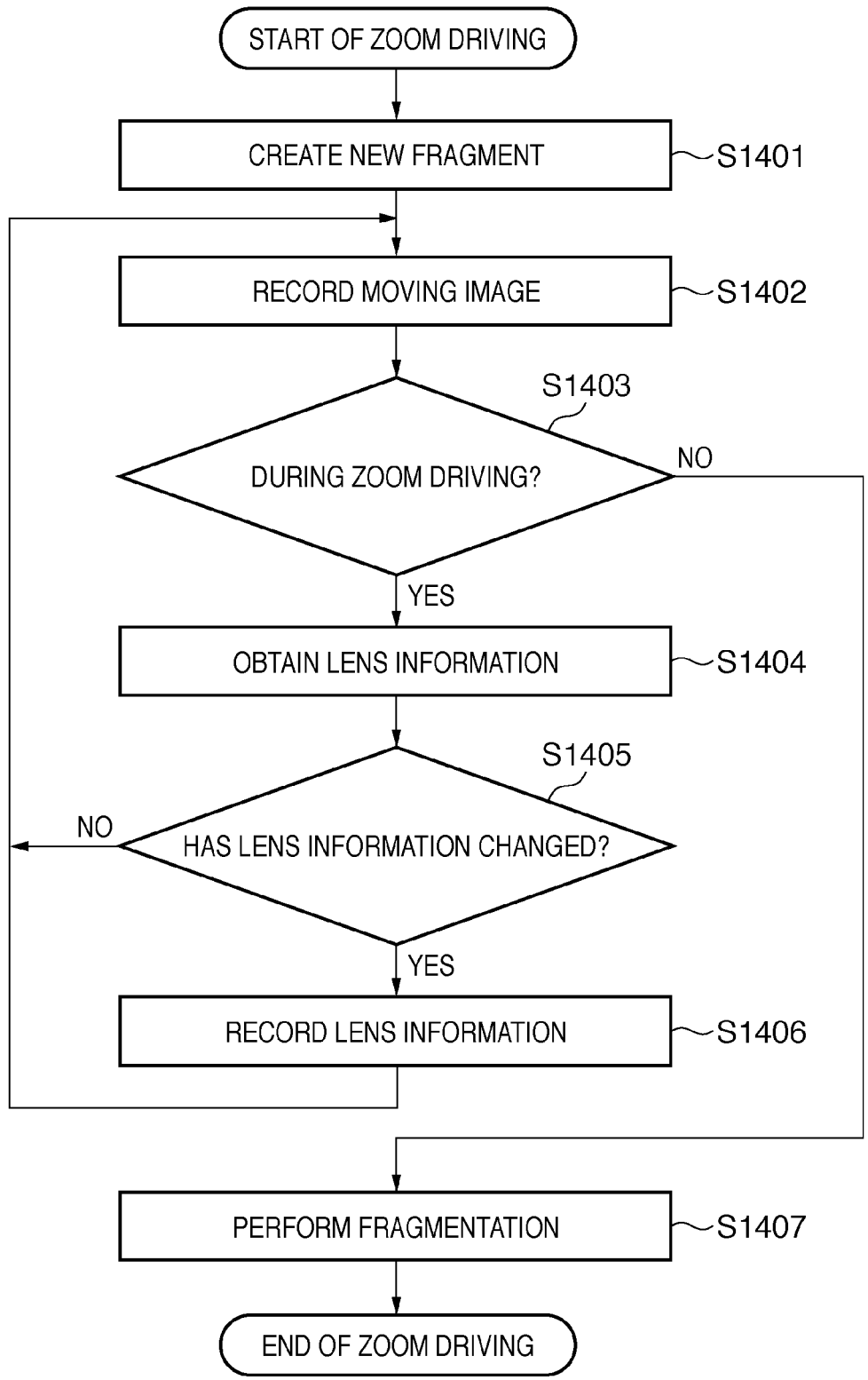
FIG. 24 is a flowchart showing a fragmentation method in zoom driving in the third embodiment.

FIG. 24 is a flowchart showing an operation when a lens unit 300 is driven to zoom during moving image shooting.

In the third embodiment, when the system control circuit 50 detects that a zoom control unit 344 has started zoom driving during moving image shooting, it performs the following processing.

Upon detecting the start of zoom driving, the system control circuit 50 newly creates a fragment (step S1401). The shot moving image data is fragmented to record the fragments.

Then, the system control circuit 50 exposes the image sensor 14 to perform moving image shooting processing. The memory 30 stores the generated moving image data. An image processing circuit 20 performs image processing sequentially for respective frames of the moving image data, and the memory 30 records them (step S1402).

The system control circuit 50 receives, from the zoom control unit 344, information representing whether the lens is during zoom driving. The system control circuit 50 determines whether the lens unit 300 is during zoom driving (zoom operation) (step S1403).

If the system control circuit 50 determines in step S1403 that the lens unit 300 is during zoom driving, it obtains lens information (step S1404). The lens information includes an aperture value and pupil position.

The system control circuit 50 determines whether the lens information of the current frame that has been obtained in step S1404 has changed from that of a previous frame (step S1405).

If the system control circuit 50 determines in step S1405 that the lens information has changed, it records the lens information of the current frame in moof of metadata of the current fragment (step S1406).

If the system control circuit 50 determines in step S1405 that no lens information has changed, it performs moving image shooting, image processing, and compression processing without fragmentation, and writes the moving image data in mdat of the current fragment.

During zoom driving, changed lens information is additionally written in moof of metadata of one fragment. Simultaneously when recording lens information in the header, information on the number of frames or the like representing the range of frames corresponding to the same lens information is also written. The information representing the range of frames corresponding to the same lens information is not limited to the number of frames, and may also be another one as far as it can specify lens information and corresponding frames.

If the system control circuit 50 determines in step S1403 that the lens unit 300 is not during zoom driving, it performs fragmentation to newly create a fragment, and ends the operation during zoom driving.

The series of processes (steps S1402 to S1406) is repeated until the system control circuit 50 determines that zoom driving has ended.

In moving image playback, when converting dust correction parameters in step S1805 in dust removal processing of FIG. 10, lens information corresponding to each frame is read out from moof of the fragment to perform dust removal.

The third embodiment provides the following effects.

Since dust correction data is attached to an image in the above-described manner, this obviates the need to pay attention to the correspondence between dust correction image data and shot image data. Dust correction data is compact data formed from the position, size, and conversion data (aperture value and lens pupil position information), and does not excessively increase the size of shot image data. Interpolation processing is done for only a region containing pixels designated by dust correction data, so the probability of detection errors can greatly decrease.

During zoom driving of the lens, no fragmentation is executed, and pieces of lens information are recorded in one fragment. Fragmentation is not unnecessarily executed, reducing the data amount.

Since unnecessary fragmentation is not done, the load of moving file playback processing decreases.

(Fourth Embodiment)

In the third embodiment, lens information is obtained when recording each frame of a moving image during zoom driving of the lens. If the lens information changes, it is recorded.

To the contrary, in the fourth embodiment, lens information is recorded at only the start and end of zoom driving of the lens.

Figure 25:
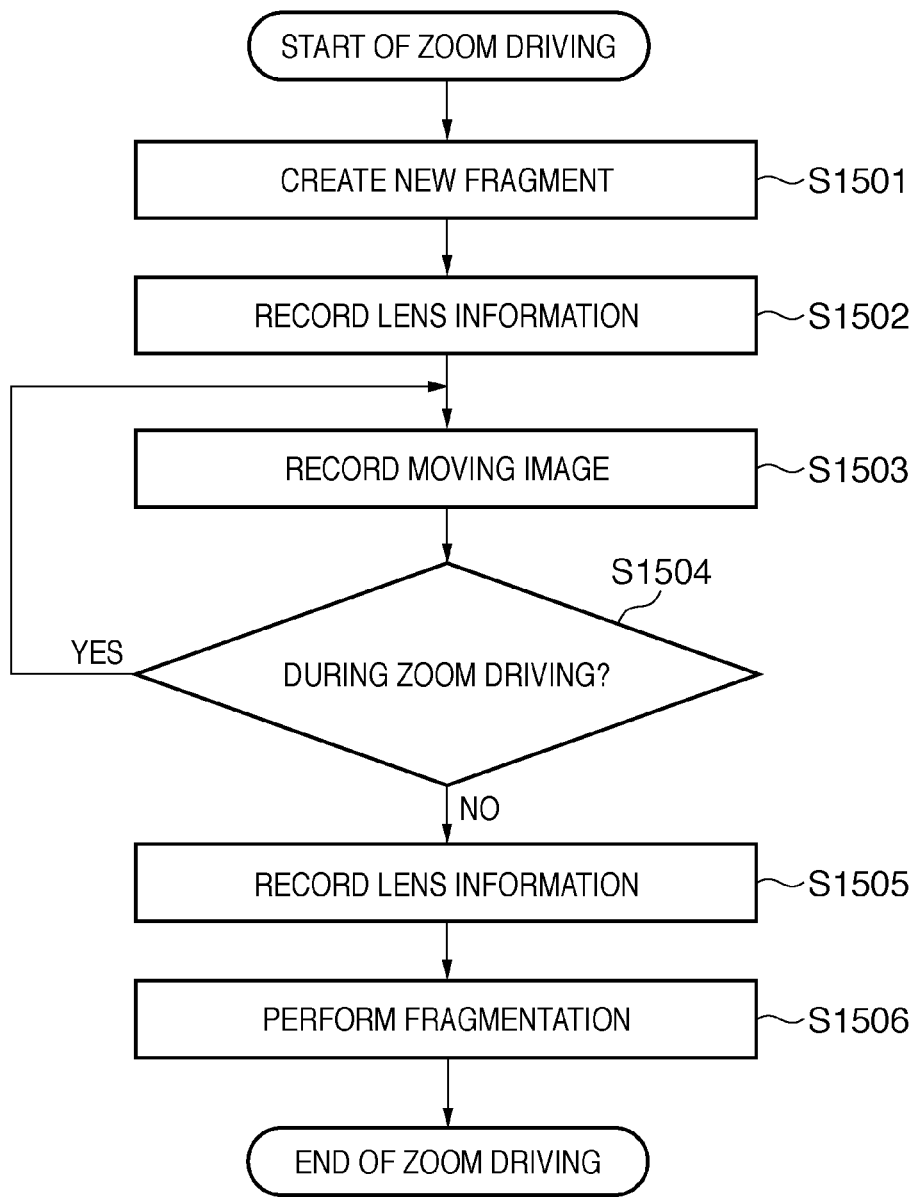
FIG. 25 is a flowchart showing a fragmentation method in zoom driving in the fourth embodiment.

FIG. 25 is a flowchart showing moving image recording processing during zoom driving in the fourth embodiment.

In the fourth embodiment, when a system control circuit 50 detects that a zoom control unit 344 has started zoom driving during moving image shooting, it performs the following processing.

Upon detecting that zoom driving has started, the system control circuit 50 newly creates a fragment (step S1501).

Then, the system control circuit 50 obtains lens information. As lens information at the start of zoom driving, the obtained lens information is recorded in moof of metadata of the current fragment (step S1502). The lens information includes an aperture value and pupil position.

The system control circuit 50 exposes an image sensor 14 to perform moving image shooting processing. A memory 30 stores the shot moving image. An image processing circuit 20 performs image processing sequentially for respective frames of the shot moving image, and the memory 30 records them (step S1503).

The system control circuit 50 receives, from the zoom control unit 344, information representing whether the lens is during zoom driving. The system control circuit 50 determines whether the lens is during zoom driving (step S1504).

The processes in steps S1503 and S1504 are repeated until the system control circuit 50 determines that the lens is not during zoom driving.

If the system control circuit 50 determines in step S1504 that the lens is not during zoom driving, i.e., zoom driving has ended, it obtains lens information (step S1505). As lens information at the end of zoom driving, the obtained lens information is recorded in moof of metadata of the current fragment. The lens information includes an aperture value and pupil position.

The system control circuit 50 performs fragmentation to newly create a fragment, and ends the sequence during zoom driving (step S1506).

When converting dust correction parameters in step S1805 in dust removal processing of FIG. 10, the pieces of lens information at the start and end of zoom driving are read out from moof of the fragment. For intermediate frames during zoom driving, lens information is interpolated based on the difference between the pieces of lens information, thereby performing dust removal.

The fourth embodiment can achieve almost the same effects as those of the third embodiment.

Further, the fourth embodiment can reduce the data amount because lens information is recorded at only the start and end of zoom driving.

(Fifth Embodiment)

The fifth embodiment will be described. In the fifth embodiment, lens information is recorded together with a moving image at a predetermined frame interval during zoom driving of a lens.

FIG. 26 is a flowchart showing moving image recording processing during zoom driving in the fifth embodiment.

In the fifth embodiment, when a system control circuit 50 detects that a zoom control unit 344 has started zoom driving during moving image shooting, it performs the following processing.

Upon detecting that zoom driving has started, the system control circuit 50 newly creates a fragment (step S1601).

Then, the system control circuit 50 obtains lens information, and records it in moof of metadata of the current fragment (step S1602). The lens information includes an aperture value and pupil position.

The system control circuit 50 starts counting frame intervals. More specifically, the system control circuit 50 substitutes "1" into the count value (step S1603).

The system control circuit 50 exposes an image sensor 14 to perform moving image shooting processing. A memory 30 stores the shot moving image. An image processing circuit 20 performs image processing sequentially for respective frames of the shot moving image, and the memory 30 records them (step S1604).

Upon shooting one frame of the moving image, the system control circuit 50 increments, by one, the count value for counting frame intervals (step S1605).

The system control circuit 50 receives, from the zoom control unit 344, information representing whether the lens is during zoom driving.

The system control circuit 50 determines whether the lens is during zoom driving (step S1606).

The series of processes (steps S1602 to S1607) is repeated until the system control circuit 50 determines that the lens is not during zoom driving.

In step S1607, the system control circuit 50 determines whether the count value has reached a predetermined frame count (10 frames in FIG. 26). The series of processes (steps S1604 to S1607) is repeated until the count value reaches the predetermined frame count. If the count value reaches the predetermined frame count, the system control circuit 50 records lens information in step S1602, starts counting again in step S1603, and performs the series of processes (steps S1604 to S1607).

If the system control circuit 50 determines in step S1606 that the lens is not during zoom driving, i.e., zoom driving has ended, the system control circuit 50 performs fragmentation to newly create a fragment in step S1608, and ends the sequence during zoom driving.

When converting dust correction parameters in step S1805 in dust removal processing of FIG. 10, pieces of lens information of frames at predetermined intervals are read out from moov of the fragment. For intermediate frames for which no lens information is recorded, lens information is interpolated based on the difference between preceding and succeeding pieces of lens information, thereby performing dust removal.

As described above, the fifth embodiment can attain almost the same effects as those of the third embodiment. In addition, the fifth embodiment can reduce the data amount because lens information is recorded at predetermined frame intervals.

(Other Embodiments)

The objects of the embodiments are also achieved by the following method. A storage medium (or recording medium) which stores software program codes to implement the functions of the above-described embodiments is supplied to a system or apparatus. The computer (or CPU or MPU) of the system or apparatus reads out and executes the program codes stored in the storage medium. In this case, the program codes read out from the storage medium implement the functions of the above-described embodiments. The storage medium that stores the program codes constitutes the present invention. The functions of the above-described embodiments are implemented by executing the readout program codes by the computer. The present invention also includes a case wherein the operating system (OS) or the like running on the computer executes part or all of actual processing on the basis of the instructions of the program codes, thereby implementing the functions of the above-described embodiments.

The present invention also includes the following case. More specifically, the program codes read out from the storage medium are written in the memory of a function expansion card inserted into the computer or the memory of a function expansion unit connected to the computer. The CPU of the function expansion card or function expansion unit executes part or all of actual processing on the basis of the instructions of the program codes, thereby implementing the functions of the above-described embodiments.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-148319, filed Jun. 5, 2008, and No. 2008-174954, filed Jul. 3, 2008, which are hereby incorporated by reference herein in their entirety.

What is claimed is:

1. An image sensing apparatus comprising:
   an image sensing unit having an image sensor which photoelectrically converts an object image formed via an imaging lens;
   an optical member which is arranged in front of the image sensor;

a foreign substance detection unit which detects foreign substance information from a foreign substance detection image including an image of a foreign substance adhered to a surface of the optical member, the foreign substance information serving as information on at least a position and size of the foreign substance;

a lens information obtaining unit which obtains lens information of the imaging lens, the lens information serving as information on at least an aperture value and a pupil position of the imaging lens;

a memory unit which stores foreign substance position correction data including the foreign substance information and lens information obtained when the foreign substance information is detected; and a recording unit which, when shooting a moving image, records moving image data generated based on image signals successively output from the image sensing unit, and records the moving image data in association with the foreign substance position correction data;

wherein when a user changes the aperture value or the pupil position during moving image shooting, the lens information obtaining unit updates the lens information of the foreign substance position correction data and the foreign substance information of the foreign substance position correction data is not updated, and wherein the recording unit records the moving image data in association with updated foreign substance position correction data including the foreign substance information recorded when the moving image shooting is started and the updated lens information.

2. The apparatus according to claim 1, wherein when a user changes the aperture value or the pupil position during moving image shooting, the lens information obtaining unit updates the lens information and the recording unit creates a new fragment, and wherein the recording unit records the moving image data in association with the updated foreign substance position correction data in the new fragment.

3. A method of controlling an image sensing apparatus including an image sensing unit having an image sensor which photoelectrically converts an object image formed via an imaging lens, and an optical member which is arranged in front of the image sensor, the method comprising:

a foreign substance detection step of detecting foreign substance information from a foreign substance detection image including an image of a foreign substance adhered to a surface of the optical member, the foreign substance information serving as information on at least a position and size of the foreign substance;

a lens information obtaining step of obtaining lens information of the imaging lens used to image an object, the lens information serving as information on at least an aperture value and a pupil position of the imaging lens;

a storing step of storing foreign substance position correction data including the foreign substance information and lens information obtained when the foreign substance information is detected; and a recording step of, when shooting a moving image, recording moving image data generated based on image signals successively output from the image sensing unit, and recording the moving image data in association with the foreign substance position correction data;

wherein when a user changes the aperture value or the pupil position during moving image shooting, the lens information of the foreign substance position correction data is updated in the lens information obtaining step and the foreign substance information of the foreign substance position correction data is not updated, and wherein the moving image data is recorded in association with updated foreign substance position correction data including the foreign substance information recorded when the moving image shooting is started and updated lens information in the recording step.

4. A non-transitory computer-readable storage medium storing a program for causing a computer to execute a control method defined in claim 3.

* * * * *